US012623451B2

(12) United States Patent
Koch et al.

(10) Patent No.: US 12,623,451 B2
(45) Date of Patent: May 12, 2026

(54) SHEET-FED ROTARY PRINTING MACHINE COMPRISING AN ELECTRODE UNIT

(71) Applicant: KOENIG & BAUER AG, Würzburg (DE)

(72) Inventors: Heinz Michael Koch, Dresden-Cossebaude (DE); Philipp Hoyer, Dresden (DE); Ulrich Köhler, Radebeul (DE); Wolfgang Schubert, Taucha (DE); Stefan Singer, Radebeul (DE)

(73) Assignee: KOENIG & BAUER AG, Würzburg (DE)

( * ) Notice: Subject to any disclaimer, the term of this patent is extended or adjusted under 35 U.S.C. 154(b) by 0 days.

(21) Appl. No.: 19/124,952

(22) PCT Filed: Nov. 8, 2023

(86) PCT No.: PCT/EP2023/081146
§ 371 (c)(1),
(2) Date: Apr. 28, 2025

(87) PCT Pub. No.: WO2024/175224
PCT Pub. Date: Aug. 29, 2024

(65) Prior Publication Data

US 2026/0008264 A1 Jan. 8, 2026

(30) Foreign Application Priority Data

Feb. 20, 2023 (DE) ..................... 10 2023 104 095.2

(51) Int. Cl.
*B41F 21/00* (2006.01)
*B41F 21/10* (2006.01)

(52) U.S. Cl.
CPC ............ *B41F 21/005* (2013.01); *B41F 21/10* (2013.01)

(58) Field of Classification Search
CPC .................... G03G 2215/00649; B41F 21/005
See application file for complete search history.

(56) References Cited

U.S. PATENT DOCUMENTS 3,174,748 A 3/1965 Roberts et al.
3,341,195 A 9/1967 Herman et al.
(Continued)

FOREIGN PATENT DOCUMENTS

CN 102481778 A 5/2012
CN 112888569 A 6/2021
(Continued)

OTHER PUBLICATIONS

Chinese Office Action received in corresponding Chinese Application No. 202380075856.2 dated Aug. 16, 2025.
(Continued)

*Primary Examiner* — Howard J Sanders
(74) *Attorney, Agent, or Firm* — MATTINGLY & MALUR, PC

(57) ABSTRACT

Examples relate to a sheet-fed rotary printing machine including a coating unit, which includes an impression cylinder and a further cylinder forming a contact zone therewith. The coating unit comprises a charging device for electrostatically fixing sheets on the impression cylinder, which includes an electrode unit that is directed toward the outer cylindrical surface of the impression cylinder. A charging core zone includes a region of an outer cylinder surface of the impression cylinder that is located next to the electrode unit. The charging core zone is arranged downstream from the contact zone and upstream from a transfer point leading away from the impression cylinder. An electrode of the electrode unit has a minimum first distance with respect to the impression cylinder of between 4 mm and 13 mm and
(Continued)

a minimum second distance with respect to the further cylinder of between 4 mm and n 35 mm.

15 Claims, 15 Drawing Sheets

(56) References Cited

U.S. PATENT DOCUMENTS

| | | | | |
|---|---|---|---|---|
| 3,342,129 | A | 9/1967 | William | |
| 3,346,253 | A | 10/1967 | Paschke | |
| 7,328,899 | B2 * | 2/2008 | Wulf | B41F 21/005 101/415.1 |
| 11,214,053 | B2 * | 1/2022 | Siemer | B41F 11/02 |
| 2006/0150841 | A1 * | 7/2006 | Bachmeier | B41F 22/00 101/232 |
| 2022/0204295 | A1 * | 6/2022 | Koch | B41F 15/0809 |

FOREIGN PATENT DOCUMENTS

| | | | | |
|---|---|---|---|---|
| DE | 1286051 | B | 1/1969 | |
| DE | 10033839 | A1 | 1/2002 | |
| DE | 10041934 | A1 | 3/2002 | |
| DE | 102005031498 | A1 | 1/2007 | |
| DE | 102008001165 | A1 | 10/2009 | |
| DE | 102010003046 | A1 | 9/2011 | |
| DE | 102023125603 | A1 * | 3/2025 | B41F 21/106 |
| DE | 102023125604 | A1 * | 3/2025 | B41F 33/02 |
| DE | 102023125606 | A1 * | 3/2025 | B41F 33/02 |
| EP | 2982510 | A1 | 2/2016 | |
| WO | 02/07977 | A1 | 1/2002 | |
| WO | 2020074135 | A1 | 4/2020 | |
| WO | WO-2024175224 | A1 * | 8/2024 | B41F 21/10 |
| WO | WO-2025061417 | A1 * | 3/2025 | B65H 29/52 |

OTHER PUBLICATIONS

International Search Report of PCT/EP2023/081146 dated Feb. 6, 2024.

* cited by examiner

SHEET-FED ROTARY PRINTING MACHINE COMPRISING AN ELECTRODE UNIT

CROSS-REFERENCES TO RELATED APPLICATIONS

This application is the US national phase, under 35 USC § 371, of PCT/EP2023/081146, filed on Nov. 8, 2023, published as WO 2024/175224 A1 on Aug. 29, 2024, and claiming priority to DE 10 2023 104 095.2 filed on Feb. 20, 2023, and all of which are incorporated by reference herein in their entireties.

TECHNICAL FIELD

Some examples herein relate to a sheet-fed rotary printing machine comprising an electrode unit. For example, the sheet-fed rotary printing machine may include at least one coating unit, which includes at least one impression cylinder and at least one further cylinder forming a contact zone with the impression cylinder and configured as a transfer cylinder or finish coating forme cylinder. The coating unit includes at least one charging device for electrostatically fixing sheets on the impression cylinder, the charging device comprising at least one electrode unit that is directed and/or can be directed toward an outer cylindrical surface of the impression cylinder. A charging core zone includes a region of an outer cylinder surface, enveloping a cylinder barrel of the impression cylinder, which is located closest to the at least one electrode unit. The charging core zone is arranged downstream from the contact zone and upstream from a transfer point leading away from the impression cylinder, viewed in the direction of rotation of the impression cylinder.

BACKGROUND

In sheet-fed offset printing machines, sheets are provided with coating agent, for example with printing ink, in a contact zone between a transfer cylinder and an impression cylinder. Other coating units are known as well, for example flexographic coating units, in which the sheets cooperate directly with a plate cylinder and an impression cylinder. These are employed, for example, as printing units or as coating units. Depending on the properties of the coating agent and the sheets, it is possible for the sheets to adhere to the transfer cylinder or the plate cylinder. While a movement of the leading sheet edge is decisively determined by the grippers of the impression cylinder, the sheet can thus expand significantly in the rear area and/or detach from the impression cylinder. As soon as the trailing edge of the particular sheet leaves the contact zone, an abrupt relaxation movement of this sheet may occur. The trailing edge of the sheet can even at times surpass the target position thereof on the cylinder circumference. This can adversely affect the further transport of sheets. In particular, however, it is problematic when an inspection system is provided, which the sheets situated on the impression cylinder pass so as to be inspected. The expansion and the abrupt change in the position of the sheets makes an evaluation difficult or impossible, in particular in the rear area of the particular sheet.

Devices are known which, by means of blower air and/or electrostatic charge, are intended to fix the sheets in the correct position on the impression cylinder.

A sheet-fed rotary printing machine is known from U.S. Pat. No. 3,346,253 A, which comprises an electrode unit in the region downstream from the contact zone between the transfer cylinder and the impression cylinder, wherein the position of this electrode unit can be set by means of adjusting screws and this electrode unit should preferably be arranged approximately two inches (5.08 cm) away from the impression cylinder.

A sheet-fed rotary printing machine is known both from U.S. Pat. Nos. 3,342,129 A and 3,174,748 A, comprising an electrode unit in the region downstream from the contact zone between the transfer cylinder and the impression cylinder so as to prevent smudging of the printing ink.

A sheet-fed rotary printing machine is known from DE 10 2008 001 165 A1, in which sheets are electrostatically charged upstream from the contact zone between the transfer cylinder and the impression cylinder to facilitate an inspection downstream from this contact zone.

A sheet-fed rotary printing machine is known from DE 10 2010 003 046 A1, which comprises a blower device in the region downstream from the contact zone between the transfer cylinder and the impression cylinder to facilitate an inspection downstream from this contact zone.

A sheet-fed rotary printing machine is known from EP 2 982 510 A1, comprising an ink jet module that is arranged in the region downstream from the contact zone between the transfer cylinder and the impression cylinder and that, within a housing of this module, comprises an electrostatic sheet guide device to facilitate ink jet printing and an inspection within this module.

A sheet-fed printing machine is known from DE 100 33 839 A1, which can comprise a respective drying device at various points, wherein an electrode is provided to support the drying process, the distance of which in relation to an impression cylinder can be varied so as to be able to prevent a collision with a gripper system.

A sheet-fed printing machine is known from DE 100 41 934 A1, which comprises a drying device, wherein an electrode is provided to support the drying process, the distance of which in relation to an impression cylinder is several millimeters.

A sheet-fed printing machine is known from WO 02/07977 A1, which utilizes a combination of blower air and electrostatic charge to fix a sheet in a suitable position on an impression cylinder in front of a nip.

A sheet-fed rotary printing machine is known from both DE 10 2005 031 498 A1 and DE 12 86 051 B, the coating unit of which comprises an impression cylinder and a transfer cylinder forming a contact zone therewith as well as a charging device that comprises an electrode unit which is directed toward the impression cylinder and the charging core zone of which is arranged downstream from the contact zone and upstream from a transfer point.

A sheet-fed rotary printing machine is known from WO 2020/074135 A1, the coating unit of which comprises a transfer cylinder as well as an impression cylinder cooperating therewith, wherein an electrode unit of a charging device is arranged so as to be directed toward a transport cylinder following downstream from the impression cylinder, and wherein electrodes of the electrode unit have a minimum distance with respect to this transport cylinder which is at least 40 mm to avoid contact between the sheet and the transport cylinder.

SUMMARY

It is an object of some examples herein to create a sheet-fed rotary printing machine comprising an electrode unit.

The object is achieved in some examples by the sheet-fed rotary printing machine including an electrode unit as discussed above. The sheet-fed rotary printing machine includes at least one electrode of the at least one electrode unit, and which has has a minimum first distance with respect to the impression cylinder, which is at least 4 mm and which is no more than 13 mm. The at least one electrode of the at least one electrode unit has a minimum second distance with respect to the further cylinder, which is at least 4 mm and which is no more than 35 mm.

A sheet-fed rotary printing machine comprises at least one rotational transport body for transporting sheets. The sheet-fed rotary printing machine comprises at least one coating unit, which is designed, for example, as a printing unit or as finish coating unit. The rotational transport body is designed as an impression cylinder. This impression cylinder forms a contact zone with a further cylinder, wherein this further cylinder is designed, for example, as a transfer cylinder or as a finish coating forme cylinder. The sheet-fed rotary printing machine comprises at least one charging device for electrostatically fixing sheets on the rotational transport body. In particular, the coating unit, which, for example, is designed as a printing unit or finish coating unit, comprises at least one charging device for electrostatically fixing sheets on the impression cylinder, the charging device comprising at least one electrode unit that is directed and/or can be directed toward an outer cylindrical surface of the impression cylinder.

In a refinement, the sheet-fed rotary printing machine is preferably characterized in that the at least one electrode unit is arranged so as to be movable between at least two positions. For example, one of the at least two positions is a working position and/or one, in particular another, of the at least two positions is a backed-away position. It is then possible to combine a very close arrangement of the electrode unit, for a particularly good work result, with a backing-away capability, for particularly easy accessibility. The charging device thus preferably comprises at least one electrode unit that is arranged so as to be movable between at least two positions and directed and/or directable toward an outer cylindrical surface of the rotational transport body and that comprises at least one electrode.

A charging core zone is a region of an outer cylinder surface, enveloping a cylinder barrel of the impression cylinder, which is located closest to the at least one electrode unit. The charging core zone is arranged downstream from the contact zone and upstream from a transfer point leading away from the impression cylinder, viewed in the direction of rotation of the impression cylinder. In particular when the electrode unit is arranged in the working position thereof, at least one electrode has, and preferably multiple electrodes, and more preferably all electrodes, of the at least one electrode unit have a minimum first distance with respect to the impression cylinder, which is at least 4 mm, more preferably at least 5 mm, still more preferably at least 7 mm, and still more preferably at least 9 mm, and which is no more than 13 mm, more preferably no more than 12 mm, and still more preferably no more than 11 mm. In particular when the electrode unit is arranged in the working position thereof, the at least one electrode has, and preferably the multiple or all electrodes, of the at least one electrode unit have a minimum second distance with respect to the further cylinder, which is at least 4 mm, more preferably at least 5 mm, still more preferably at least 7 mm, and still more preferably at least 9 mm, and which is no more than 35 mm, more preferably no more than 20 mm, still more preferably no more than 15 mm, and still more preferably no more than 12 mm. This yields the advantage that sheets, to the largest possible extent, can be electrostatically fixed on the impression cylinder before the trailing edge thereof leaves the contact zone. Potential corresponding problems are thus minimized, even in the event of an abrupt relaxation of the part of the sheet that has not yet been fixed. The electrostatic forces that occur are utilized to place the respective sheet flat against the impression cylinder and/or generate a frictional force that prevents or drastically decelerates a relaxation movement of the particular sheet. This, for example, allows an inspection across the entire surface area of the sheets to be carried out with high quality.

In an alternative or additional refinement, the sheet-fed rotary printing machine is preferably characterized in that at least one inspection system is assigned to the coating unit, which comprises a camera that is arranged so as to be directed, in particular with the detection range thereof, toward an inspection zone that is assigned to the impression cylinder, and that the inspection zone, viewed in the direction of rotation of the impression cylinder, is arranged downstream from the contact zone and upstream from the transfer point leading away from the impression cylinder. An inspection can thus be carried out with particularly high precision. In an alternative or additional refinement, the sheet-fed rotary printing machine is preferably characterized in that the charging core zone, viewed in the direction of rotation of the impression cylinder, is arranged upstream from the inspection zone and in particular downstream from the contact zone, in particular when the electrode unit is arranged in the working position thereof. Preferably, no further device, in particular no shielding device and/or no housing different from the electrode device, is arranged in the region downstream from the contact zone and upstream from the charging core zone, viewed in the direction of rotation.

In an alternative or additional refinement, the sheet-fed rotary printing machine is preferably characterized in that a working voltage of the electrode unit, which is applied and/or can be applied during normal operation, is at least 2 kV, more preferably at least 3 kV, still more preferably at least 5 kV, and still more preferably at least 8 kV. In an alternative or additional refinement, the sheet-fed rotary printing machine is preferably characterized in that a working voltage of the electrode unit, which is applied and/or can be applied during normal operation, is no more than 20 kV, more preferably no more than 15 kV, still more preferably no more than 12 kV, and still more preferably no more than 11 kV. This ensures the best-possible fixation of the sheets, while ensuring operational safety and targeted detachability.

In an alternative or additional refinement, the sheet-fed rotary printing machine is preferably characterized in that the at least one charging device is connected by circuitry to a higher-level machine control system of the sheet-fed rotary printing machine, in particular in such a way that the working voltage provided during normal operation is only present at the at least one electrode when sheet travel is activated. This increases the ergonomics and operational safety of the sheet-fed rotary printing machine. In an alternative or additional refinement, the sheet-fed rotary printing machine is preferably characterized in that the impression cylinder is grounded via at least one carbon brush. In an alternative or additional refinement, the sheet-fed rotary printing machine is preferably characterized in that the at least one charging device is connected by circuitry to the higher-level machine control system of the sheet-fed rotary printing machine in such a way that settings related to this charging device can be performed via a control element of the sheet-fed rotary printing machine designed, in particular, as a machine control console or touch-sensitive display device.

In an alternative or additional refinement, the sheet-fed rotary printing machine is preferably characterized in that at least one first holding element is provided for holding the electrode unit in the working position. An evasive force shall preferably be understood to mean a force that is exerted, directly or indirectly, by the at least one electrode unit on this at least one first holding element. The at least one first holding element only allows a movement of the at least one electrode unit out of the working position and, for example, toward the backed-away position effectuated by such an evasive force when this evasive force exceeds a first threshold value. A safety of the sheet-fed rotary printing machine can then be increased, and damage to the electrode device can be avoided. In an alternative or additional refinement, the sheet-fed rotary printing machine is preferably characterized in that the at least one electrode is arranged further way from the rotational transport body when the electrode unit is arranged in the backed-away position thereof than when the electrode unit is arranged in the working position thereof.

In an alternative or additional refinement, the sheet-fed rotary printing machine is preferably characterized in that at least one second holding element is provided for holding the electrode unit in the backed-away position. The backed-away position can thus also be utilized as a defined position. A restoring force shall in particular be understood to mean a force that is exerted, directly or indirectly, by the at least one electrode unit on this at least one second holding element. In an alternative or additional refinement, the sheet-fed rotary printing machine is preferably characterized in that the at least one second holding element only allows a movement of the at least one electrode unit out of the backed-away position and, in particular, toward the working position effectuated by such a restoring force when this restoring force exceeds a second threshold value.

In an alternative or additional refinement, the sheet-fed rotary printing machine is preferably characterized in that at least one positioning device is provided, which comprises at least one servo drive and by means of which the at least one electrode unit can be moved between the working position and the backed-away position. This facilitates maintenance work and/or cleaning of the electrode unit. Such cleaning, for example, must be carried out on a regular basis to enable optimal use of the charging device.

In an alternative or additional refinement, the sheet-fed rotary printing machine is preferably characterized in that the at least one positioning device can, in particular, be switched between a release state and a fixing state by means of the at least one servo drive, and that the at least one positioning device, when in the release state thereof, allows a movement of the at least one electrode unit out of the working position, and that, more preferably, the at least one positioning device, when in the fixing state thereof, fixes the at least one electrode unit in the backed-away position. This allows all positions of the electrode unit to be deliberately activated.

In an alternative or additional refinement, the sheet-fed rotary printing machine is preferably characterized in that the at least one electrode unit has an active side that, when the electrode unit is arranged in the working position, is arranged so as to face the rotational transport body and that, when the electrode unit is arranged in the backed-away position, is arranged so as to face away from the rotational transport body. In an alternative or additional refinement, the sheet-fed rotary printing machine is preferably characterized in that the at least one electrode unit is pivotably mounted and/or designed so as to be movable between the working position and the backed-away position by means of a pivoting movement. This allows a particularly simple and effective movability of the electrode unit.

In an alternative or additional refinement, the sheet-fed rotary printing machine is preferably characterized in that the at least one servo drive of the at least one positioning device is designed as a pneumatic cylinder and/or as a hydraulic cylinder and/or as an electric drive and/or as a linear drive. In an alternative or additional refinement, the sheet-fed rotary printing machine is preferably characterized in that the at least one servo drive is arranged so as to be connected in an articulated manner to the at least one electrode unit. In an alternative or additional refinement, the sheet-fed rotary printing machine is preferably characterized in that the at least one servo drive is in particular arranged in an articulated manner on a sliding block that is arranged movably along a guide.

In an alternative or additional refinement, the sheet-fed rotary printing machine is preferably characterized in that the sliding block, for holding the electrode unit in the working position, can be held in a first holding position by means of the at least one first holding element and/or that the sliding block, for holding the electrode unit in the backed-away position, can be held in a second holding position by means of the at least one second holding element.

In an alternative or additional refinement, the sheet-fed rotary printing machine is preferably characterized in that the at least one first holding element is designed a mechanical detent element and/or comprises at least one spring element and/or that the at least one second holding element is designed as a mechanical detent element and/or comprises at least one spring element. This allows a particularly cost-effective design.

BRIEF DESCRIPTION OF THE DRAWINGS

An exemplary embodiment of the invention is illustrated in the drawing and will be described in greater detail below. The figures show.

DETAILED DESCRIPTION

Figure 1:
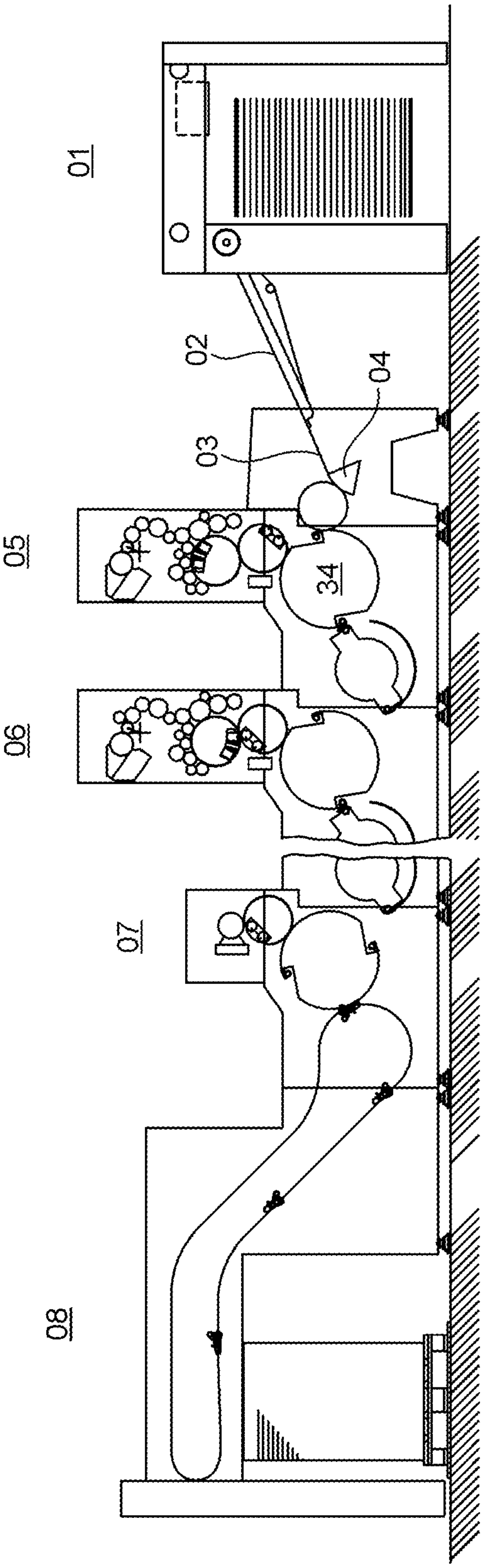
FIG. 1 a schematic representation of a sheet processing machine.

A machine that processes sheet-format substrate B, for example a sheet processing machine, comprises a substrate feed device 01 referred to, for example, as a sheet feeder 01, an infeed device 03 referred to, for example, as a sheet infeed 03, and a substrate output device 08 referred to, for example, as a sheet delivery 08. One or more processing stages 05; 06; 07, which are also referred to as units, are arranged between the substrate feed device 01 and the substrate output device 08, which are designed, for example, as a printing unit 05, 06, a finish coating unit 07, a drying unit, a calendering unit or foil transfer unit or in another suitable manner. If the sheet processing machine is designed as a printing machine, in particular a sheet-fed printing machine or sheet-fed rotary printing machine, at least one of the units is formed by a printing unit 05, 06, in particular offset printing unit 05; 06, downstream from which preferably one or more finish coating units 07 are arranged. If several printing units 05, 06 are present, the arrangement of one or more finish coating units 07 between the printing units 05; 06 can also be provided.

Unless an explicit distinction is made, the term sheet-format substrate B, in particular printing substrate B, specifically sheet B, shall generally encompass any flat substrate B present in the form of sections, that is, including substrates B in tabular form or optionally panel form, that is, including boards or panels. The sheet-format substrate B or the sheet B thus defined here is preferably made of paper or paperboard, that is, designed as a sheet of paper or paperboard, but generally can also be formed by sheets B, boards, or optionally panels made of plastic, cardboard or metal.

Individual components of a sheet processing machine will be described in more detail hereafter based on a sheet-fed printing machine.

Figure 2:
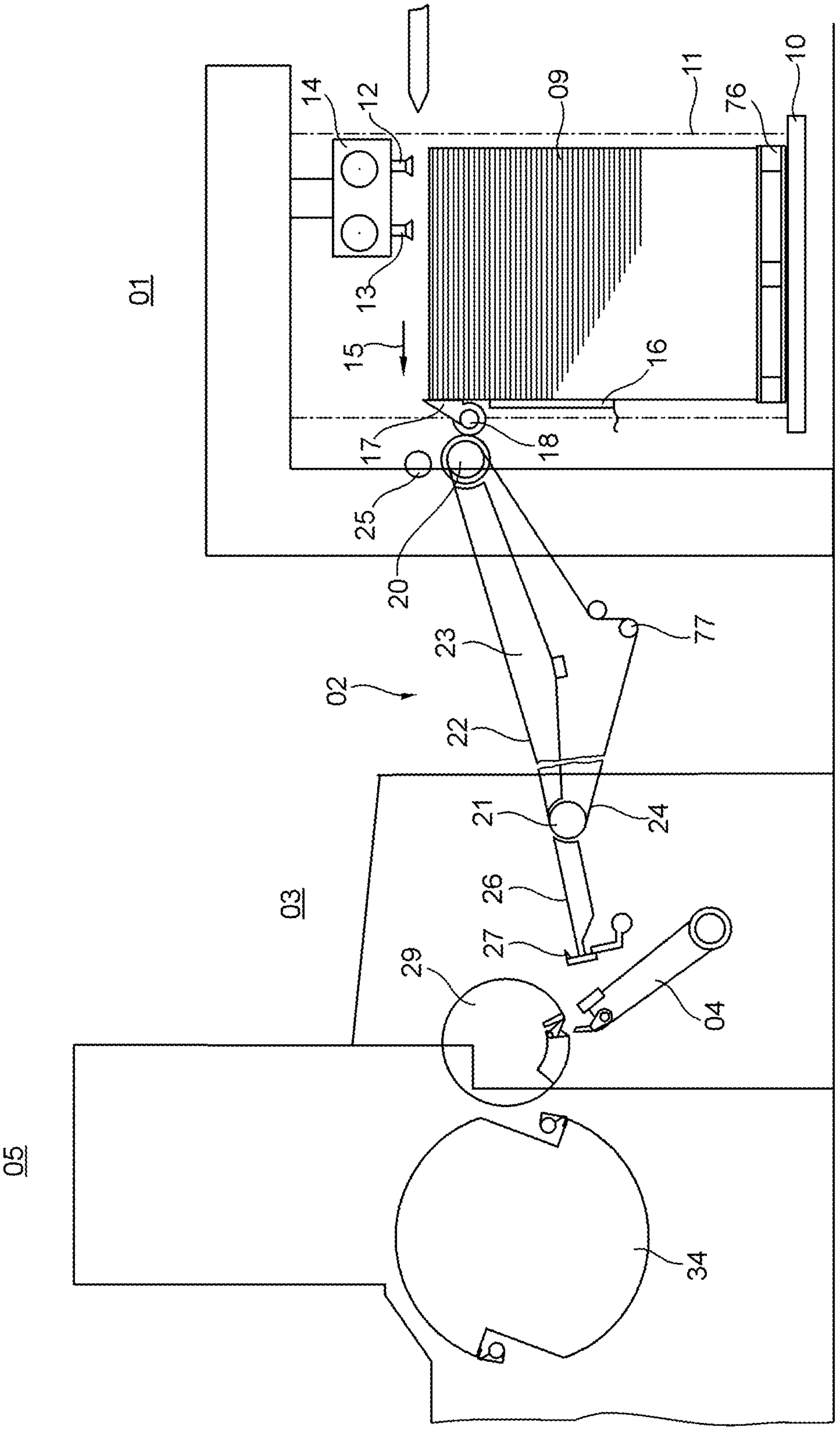
FIG. 2 a schematic representation of a sheet feeder and a sheet infeed.

For example, FIG. 2 shows a substrate feed device 01 designed as a sheet feeder 01, comprising a conveyor line 02 designed, for example, as a feed table 02 and comprising a printing substrate bundle 09 formed, for example, by a sheet pile 09, which is arranged on a receiving device 10, for example on a pile board 10. The pile board 10 is connected to transport means 11, which ensure that the upper side of the sheet pile 09 is held in a defined position.

The substrate feed device 01, which is preferably designed as a sheet feeder 01, preferably comprises sheet separating elements 12 and sheet transport elements 13. The sheet separating elements 12 are, for example, designed as separating suckers 12, and the sheet transport elements 13 are, for example, designed as transport suckers 13 and are preferably together comprised by a separating device 14, for example, accommodated in a so-called feeder head 14. The feeder head 14 is driven in such a way that the separating suckers 12 carry out a predominantly vertical movement, and the transport suckers 13 carry out a predominantly horizontal movement in or counter to a sheet transport direction 15. In one specific embodiment, dedicated drives are in each case provided for the separating suckers 12 and the transport suckers 13. Here, dedicated drives shall be understood to mean activatable drives that are assigned to one or a group of working elements (sheet separating elements 12 and/or sheet transport elements 13) for driving the same, in particular for driving the same independently of driving (preferably all) other working elements or groups of working elements, in particular without being coupled via a mechanical and/or positive drive connection to drives of other working elements that are driven individually or likewise in one or more groups.

Sheets B of the sheet pile 09 are positioned at stop elements 16, in particular with the leading sheet edge on stop surfaces of front stops 16. In the upper region of the sheet pile 09, a gate flap 17 can form an approximately vertical continuation of the stop surfaces of the front stops 16. The gate flap 17, for example, has a drive connection to a drive, preferably a dedicated drive, via a flap shaft 18 to which it is non-rotatably connected. The gate flap 17 can thus be pivoted out of the position that forms a rectilinear continuation of the stop surfaces and can thus be transferred into a position that supports the guidance of the sheets B to the downstream feed table 02. Blower devices, for example so-called blowers, for pre-loosening the sheets B located in the upper region of the sheet pile 09 and for forming an air cushion carrying the sheets B while being conveyed in the sheet transport direction 15 are preferably positioned on the rear side of the sheet pile 09. It is also possible for further blower devices or blowers and/or guide plates to be provided laterally from the sheet pile 09.

So as to avoid stopping of the sheet-fed printing machine during the so-called “change-over” of the sheet pile 09, that is, when reloading new substrate sheets B, in particular a new printing substrate bundle 09, into the substrate feed device 01, the sheet feeder 01 is equipped with a non-stop device, which is not shown here. This non-stop device in particular comprises an auxiliary pile carrier, which can be moved into the piling region of the printing machine and is arranged at a slide-in unit and which, in particular, is designed as a rake, a roller rack, or panel. The auxiliary pile carrier takes over the residual pile resting on a transport base 76, in particular a pallet 76, and preferably continuously lifts the same so as to ensure that the respective uppermost sheet B of the residual pile is separated and transported away without disruption. During this time, the new pile that is arranged on a further pallet 76 is slid in, and thereafter the residual pile is combined with the new pile.

In the exemplary embodiment, the feed table 02 arranged downstream from the sheet pile 09 is designed as a suction feed table 02. It preferably comprises two rollers 20; 21, for example one drive roller 20 and one diverting roller 21, between which a, for example, one-piece or multi-piece conveying surface 22; 23 can be provided, which is formed, for example, by a one-piece or multi-piece table top 22 or by a suction box 23 forming the table top 22. At least one conveyor belt 24, which in the case of the suction feed table 02 is designed as a suction belt 24, is wrapped around the drive roller 20 and the diverting roller 21. The belt is tensioned, for example, with the aid of a tensioning roller 77 and preferably driven by an individual belt drive, which, for example, engages on the drive roller 20, following a speed profile within a working cycle. Timing rollers 25, which are controlled against the drive roller 20 within a working cycle, correspond to the drive roller 20.

The infeed device 03, referred to, for example, as a sheet infeed 03, preferably comprises a feed table 26 to which a control device is assigned. The feed table 26 can be implemented as a feed panel 26. Stops 27, referred to, for example, as so-called front lay marks 27, in particular front stops 27, are guided in the working cycle to the feed table 26, and thus into the path of the sheets B. The sheets B are placed with the leading edges thereof against front lay marks 27 and aligned with these. A sheet acceleration means 04 is arranged downstream from the front lay marks 27, which is in particular designed as a rocking gripper 04 and which feeds the sheets B aligned with the leading edge and optionally with a side edge to a transfer drum 29 designed as a feed drum 29 which transfers the sheets B arriving from the conveyor line 02 to a printing cylinder 34 of the downstream printing unit 05.

In another embodiment, in particular the position of the sheet B on the feed table 26 is measured. The sheet B is then transferred in the movement thereof to the rocking gripper 04. Preferably during the movement of the rocking gripper 04, the sheet B is then moved into the correct position thereof and, after being aligned, is transferred to the feed drum 29.

Figure 3:
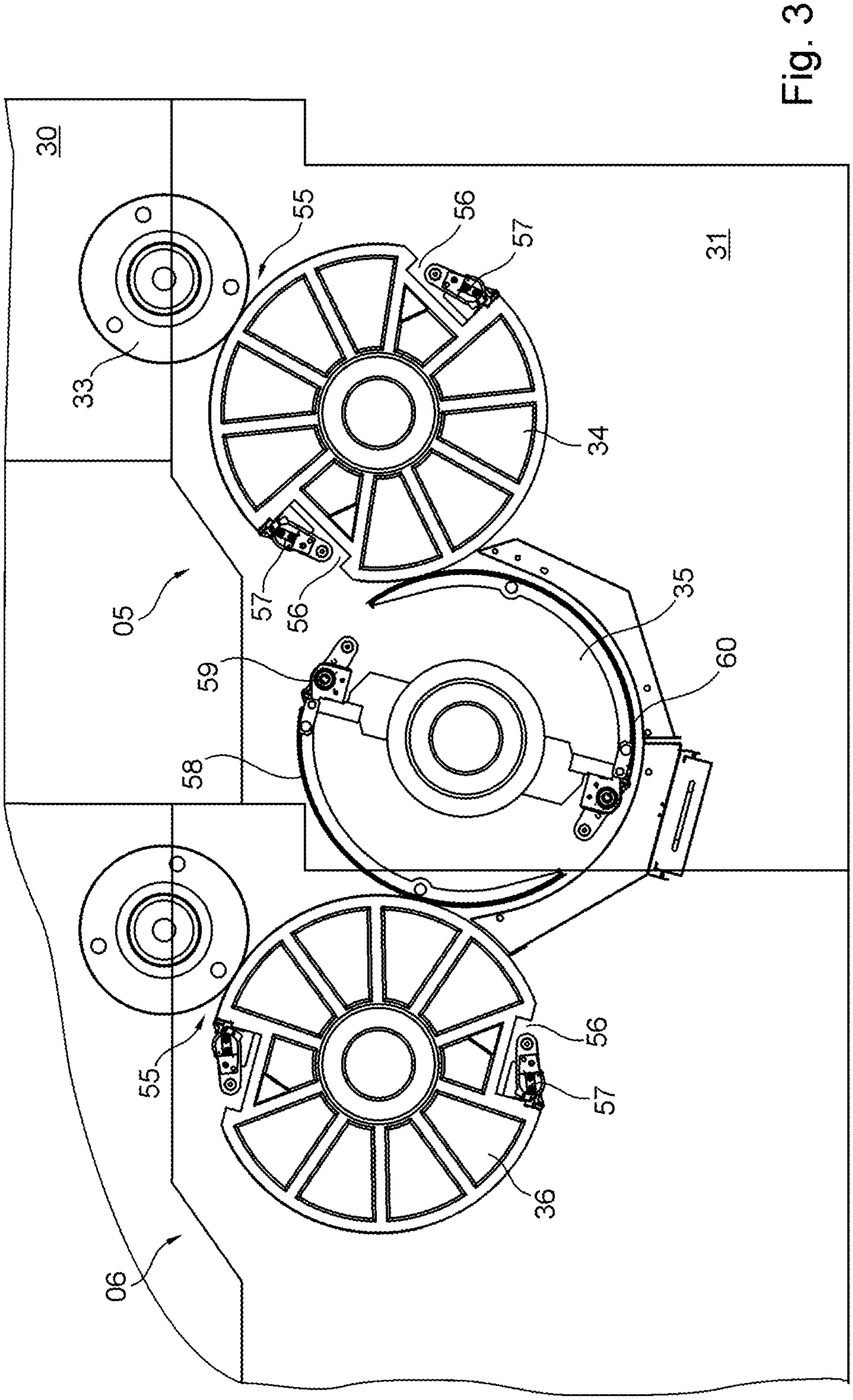
FIG. 3 a schematic representation of a substructure module of a printing unit.

The units 05; 06, in particular printing units 05; 06, have, for example, a respective substructure 31, designed for example as a substructure module 31. Of the printing units 05, 06, FIG. 3 only shows the printing cylinders 34, 36, which are also referred to as impression cylinders 34, and the transfer cylinders 33 transferring the print image, which together with the printing cylinders 34, 36 form printing zones 55 also referred to as printing nips 55 or press nips 55. The transfer cylinders 33 are also referred to as blanket cylinders 33 or rubber blanket cylinders 33. The printing cylinders 34, 36 preferably have an outer cylinder surface that is continuous with the exception of at least one axially extending cylinder channel 56. A gripper system 57 for receiving and transferring sheets B in the gripper closure is preferably arranged in the cylinder channel 56. Double-size printing cylinders 33 accordingly comprise two gripper systems 57, each arranged in a cylinder channel 56. In general, a transfer drum 35 designed as a delivery drum 35, comprising curved sheet carrying elements 58, for example so-called drum shells 58, which are arranged concentrically with respect to the axis of rotation, is arranged between the printing cylinders 34, 36. As an alternative, the transfer drum 35 can also be designed without drum shells 58 in the form of a so-called transferter 35. The transfer drums 35 preferably comprise gripper systems 59 for receiving the sheets B from the upstream printing cylinder 34 and for transferring these to the downstream printing cylinder 36. While the sheets are being transported on the drum shells 58 of the transfer drum 35, the sheets B can in particular be supported by an air cushion guide 60 arranged beneath the transfer drum 35 and thus be placed flat on the drum shells 58. The delivery drums 35, transfer drums 35 or transferrers 35 arranged between the printing cylinders 34 can have a single-size or multi-size design, but preferably also have a double-size design. Single-size cylinders can accommodate one sheet B and double-size cylinders can accommodate two sheets B on the circumference.

The units 05; 06, in particular printing units 05; 06, for example in the region of a so-called printing unit superstructure 30, comprise a printing unit cylinder 32, which is in particular designed as a forme cylinder 32, for example as a plate cylinder 32, and, in an embodiment for the offset printing method, also comprise a printing unit cylinder 32, which is in particular designed as a transfer cylinder 33, for example as a blanket cylinder 33. Furthermore, the respective printing unit 05, 06, for example in the region of a so-called printing unit substructure 31, comprises a printing unit cylinder 34 designed as a printing cylinder 34 or impression cylinder 34 and a transfer drum 35 also referred to as delivery drum 35.

As is also apparent, for example, from the schematically illustrated composition of the printing units 05, 06 in the figures, the printing units 05, 06 preferably have a modular design, in particular in such a way that the printing unit superstructure 30 is formed by a first module 30, for example a so-called superstructure module 30, and the printing unit substructure 31 is formed by a second module 31, for example a so-called substructure module 31. In the modular embodiment, the superstructure module 30, for example, comprises the forme cylinder 32, and in a configuration for the offset printing method, it also comprises the transfer cylinder 33. The substructure module 31 in particular comprises the printing cylinder 34 and, for example, the transfer drum 35. In the present context, "modular" or "module" may be understood to mean an assembly that, with the main components thereof or at least the connecting elements thereof, is to be introduced into the machine as a whole, preassembled in a frame, and possibly to be removed as such, wherein the frame is designed as a frame that can be detached from the remaining machine frame.

In the case of the modular design, the horizontal separation extends between the superstructure module 30 and the substructure module 31, preferably between the transfer cylinder 33 and the printing cylinder 34. The vertical separation surface between the substructure modules 31 or between the printing units 05, 06, viewed in the sheet transport direction 15, is predominantly placed between the transfer drum 35 of the printing unit 05 and the printing cylinder 36 of the succeeding printing unit 06.

The above-described transfer cylinder 33, designed, for example, as a blanket cylinder 33, can comprise at least one fastening device comprising a fastening means 38 for holding and/or clamping a rubber printing blanket. For example, a channel 37, which is referred to as a clamping and/or tensioning channel 37, can be provided, in which the clamping and/or tensioning elements 38, in particular for mounting a blanket, are arranged.

The forme cylinder 32, designed, for example, as a plate cylinder 32, which, for example, likewise comprises at least one fastening device comprising a fastening means 40 for holding and/or clamping a printing forme, is arranged upstream from the transfer cylinder 33, with respect to the direction of the effective ink flow. The plate cylinder 32 can have a channel 39, which is also referred to as a clamping and/or tensioning channel 39 and in which, for example, at least one tensioning and/or clamping device 40 for mounting a printing plate to the outer surface of the plate cylinder 32 is located.

An automatic or semi-automatic plate changing device 41 can be assigned to the printing unit 05, 06 in the region of the printing unit superstructure 30 or superstructure module 30.

Figure 4:
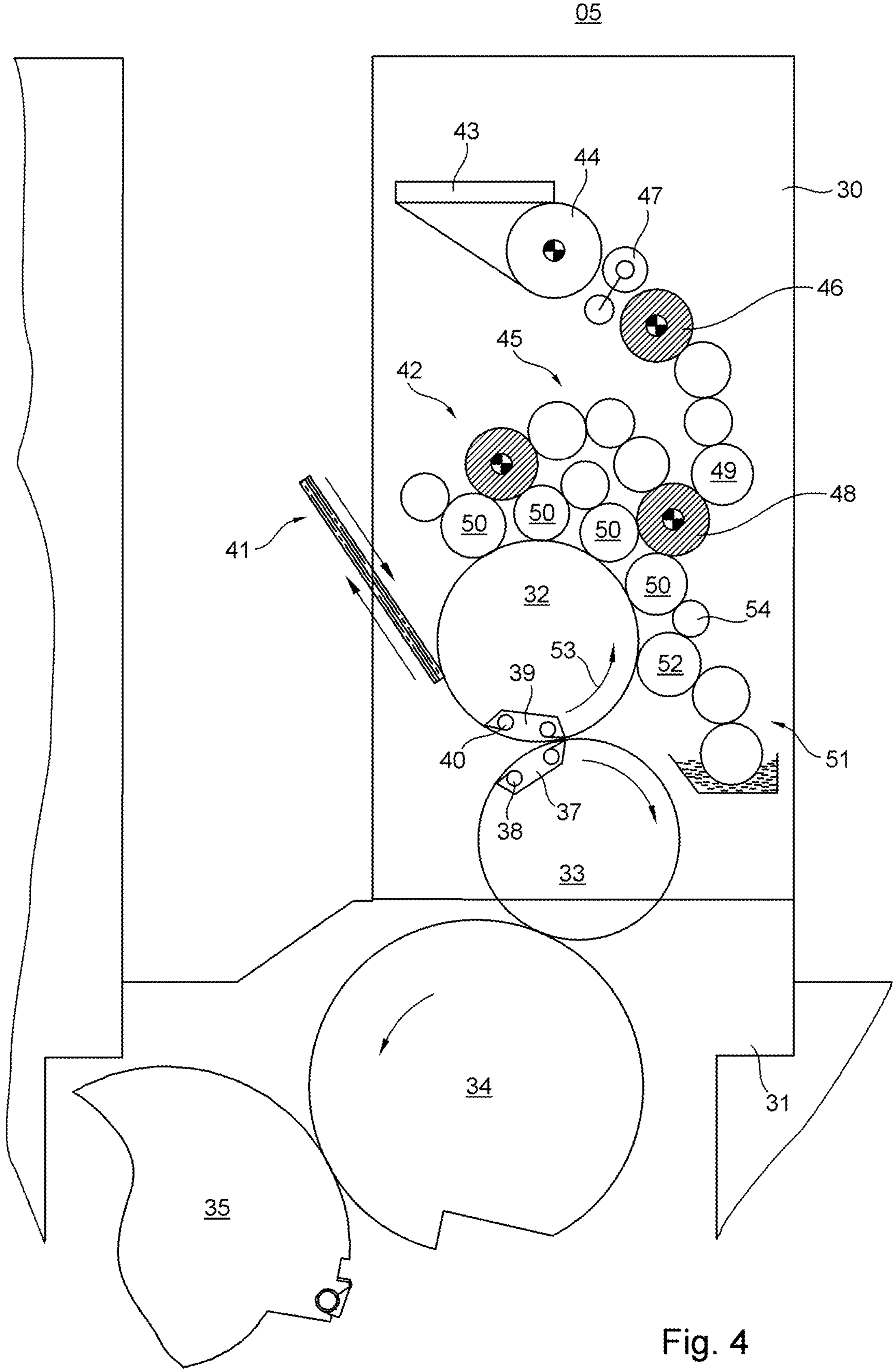
FIG. 4 a schematic representation of a superstructure module of a printing unit.
Figure 5:
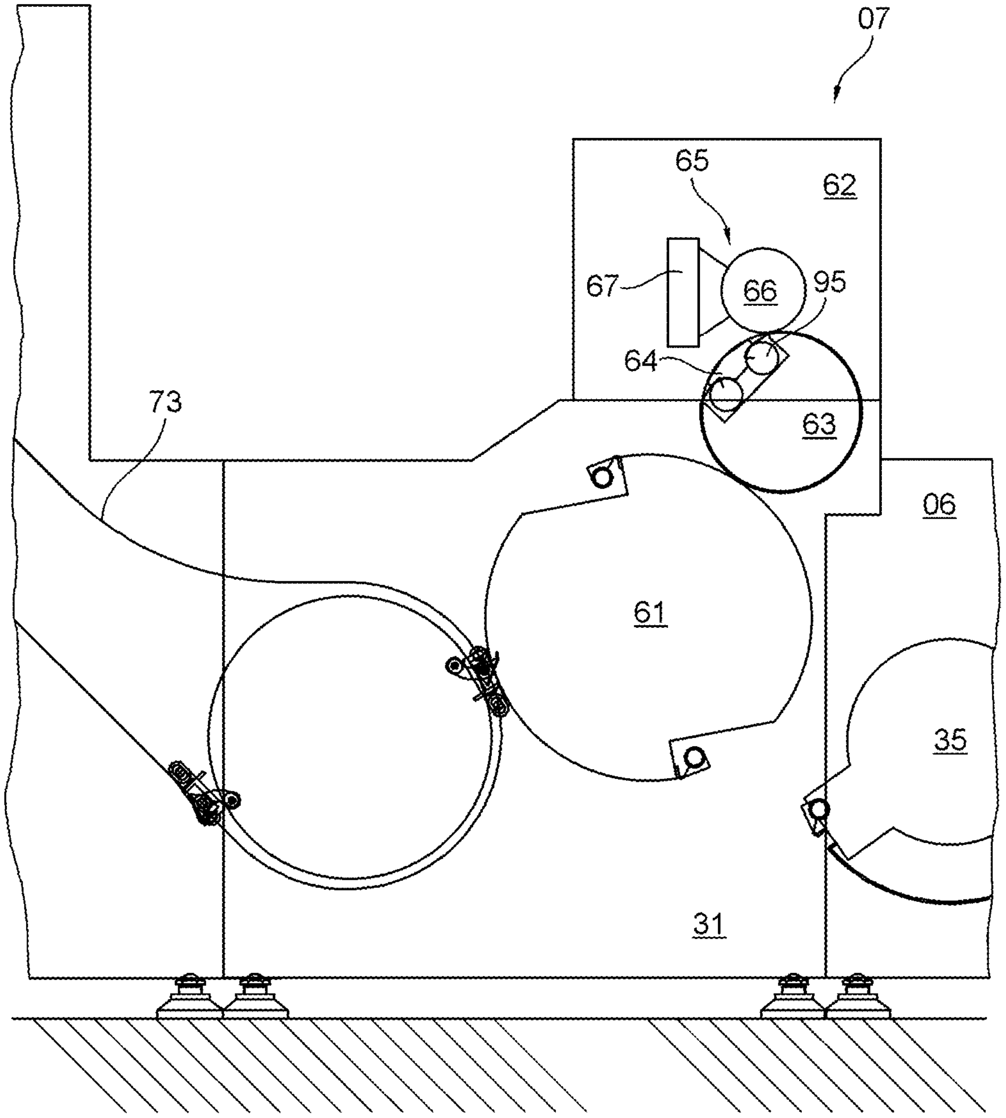
FIG. 5 a schematic representation of a coating unit.

At least one inking unit 42 is provided for inking the printing forme designed, for example, as a printing plate. The inking unit 42 can be designed as a short inking unit 42, a vibrator inking unit 42, as a film inking unit 42 or in another manner. In the case of the preferred design here as a vibrator inking unit 42, the inking unit 42 comprises at least one ink reservoir 43, which can be designed, for example, as a doctor blade or an ink fountain 43, at least one ink receiving roller 44 to be inked by the ink reservoir 43 and designed, for example, as a ductor roller or preferably as an ink fountain roller 44, one or more further inking unit rollers 45, and preferably a vibrator roller 47, for example a so-called vibrator inking roller 47, oscillating between the ink receiving roller 44 designed as an ink fountain roller 44 and a first inking unit roller 46. A distinction in terms of the inking unit rollers 45 is made, for example, between positively driven ink distributor rollers 48 (shown hatched in FIG. 4) and inking unit rollers 49 that, for example, are only driven by friction by the ink distributor rollers 48. Four ink application rollers 50 are preferably provided in the exemplary embodiment for applying the ink prepared by the inking unit rollers 45 to the printing plate.

In the direction of rotation 53 of the plate cylinder 32 during operation, a dampening forme roller 52 is optionally arranged upstream from the ink application rollers 50. This roller is assigned to a dampening unit 51, which is intended to apply damping liquid to the surface of the printing plate. A preferably switchable arch-type roller 54 can be provided between a first ink application roller 50, in the direction of rotation 53 of the plate cylinder 32, and the dampening forme roller 52. This functionally enables a connection between the dampening unit 51 and the inking unit 42. In the case of the switchable embodiment, this allows multiple operating modes for optimizing the dampening liquid supply.

The sheet-fed printing machine can include a turning device 78 for turning the sheets B to be printed. The turning device 78 is preferably arranged between the printing units 05, 06 of the machine, in particular between the printing cylinders 34. This turning device 78 is preferably configured so as to be switchable from recto printing to verso printing so that the machine operates either in the recto printing mode or in the recto and verso printing mode. Verso printing shall be understood to mean that a sheet B, after printing, is turned by a number of printing units 05, 06 so as to print the back side thereof using the succeeding printing units 05, 06.

Figure 6:
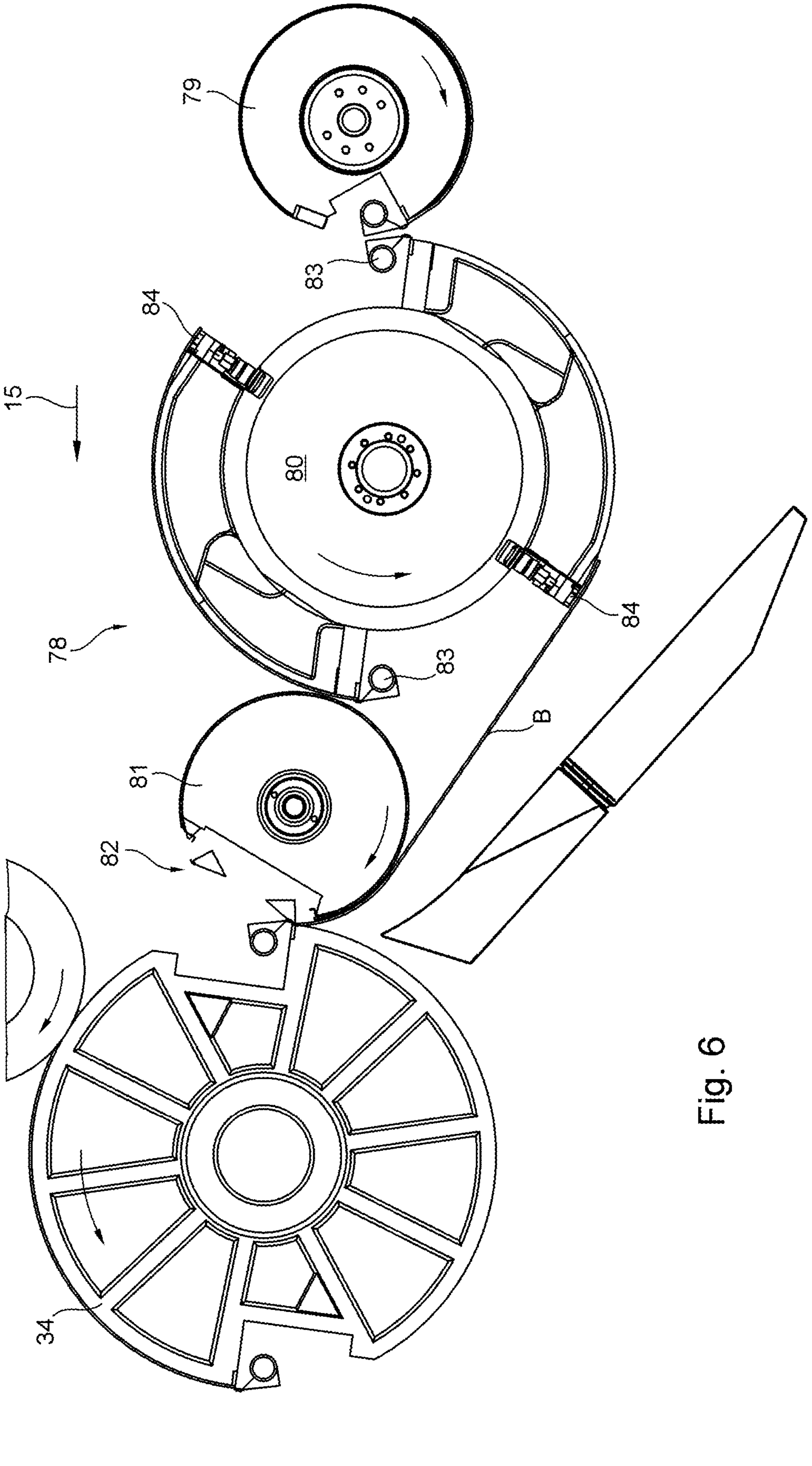
FIG. 6 a schematic representation of a turning device.
Figure 7:
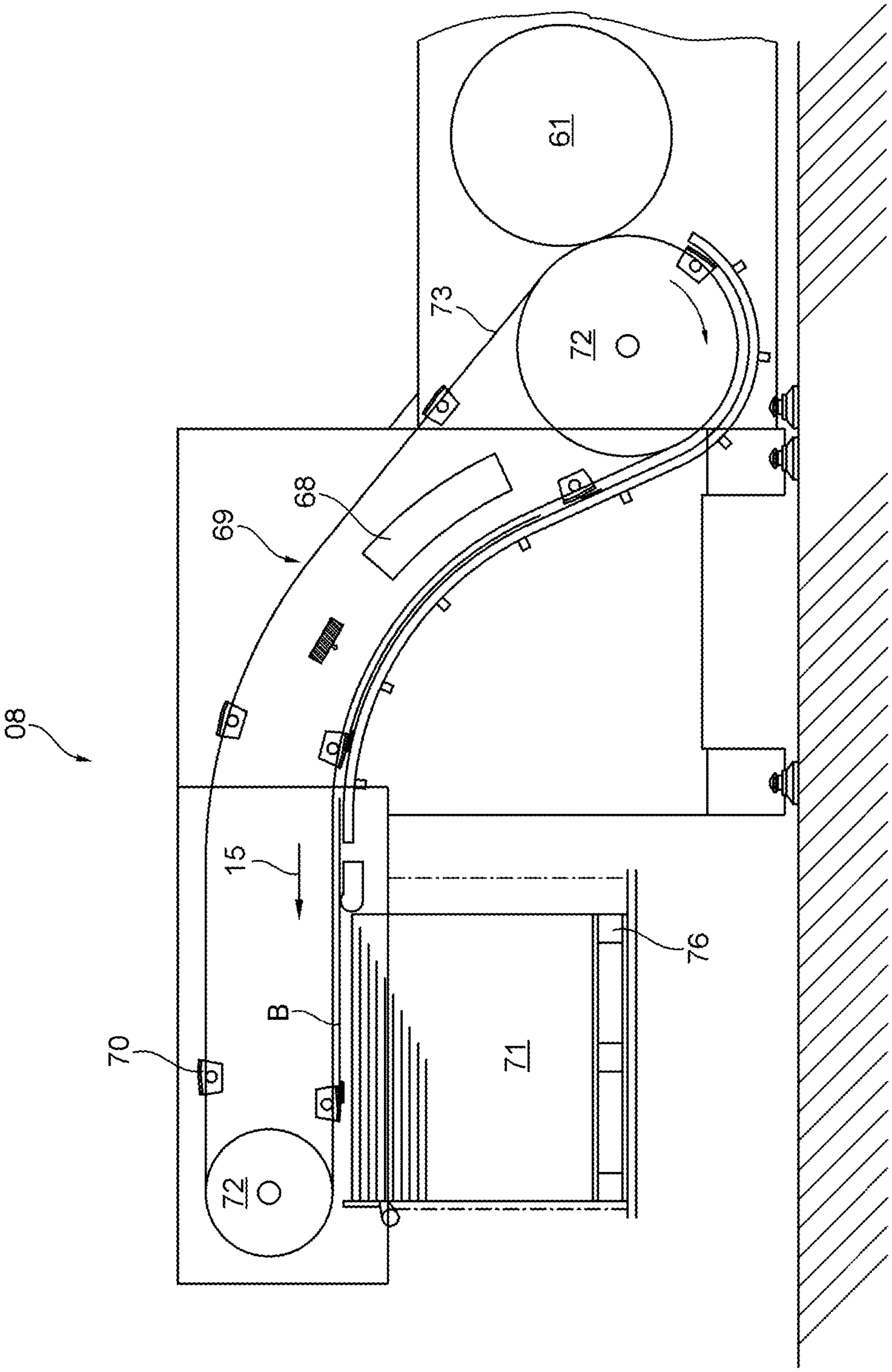
FIG. 7 a schematic representation of a sheet delivery.
Figure 8:
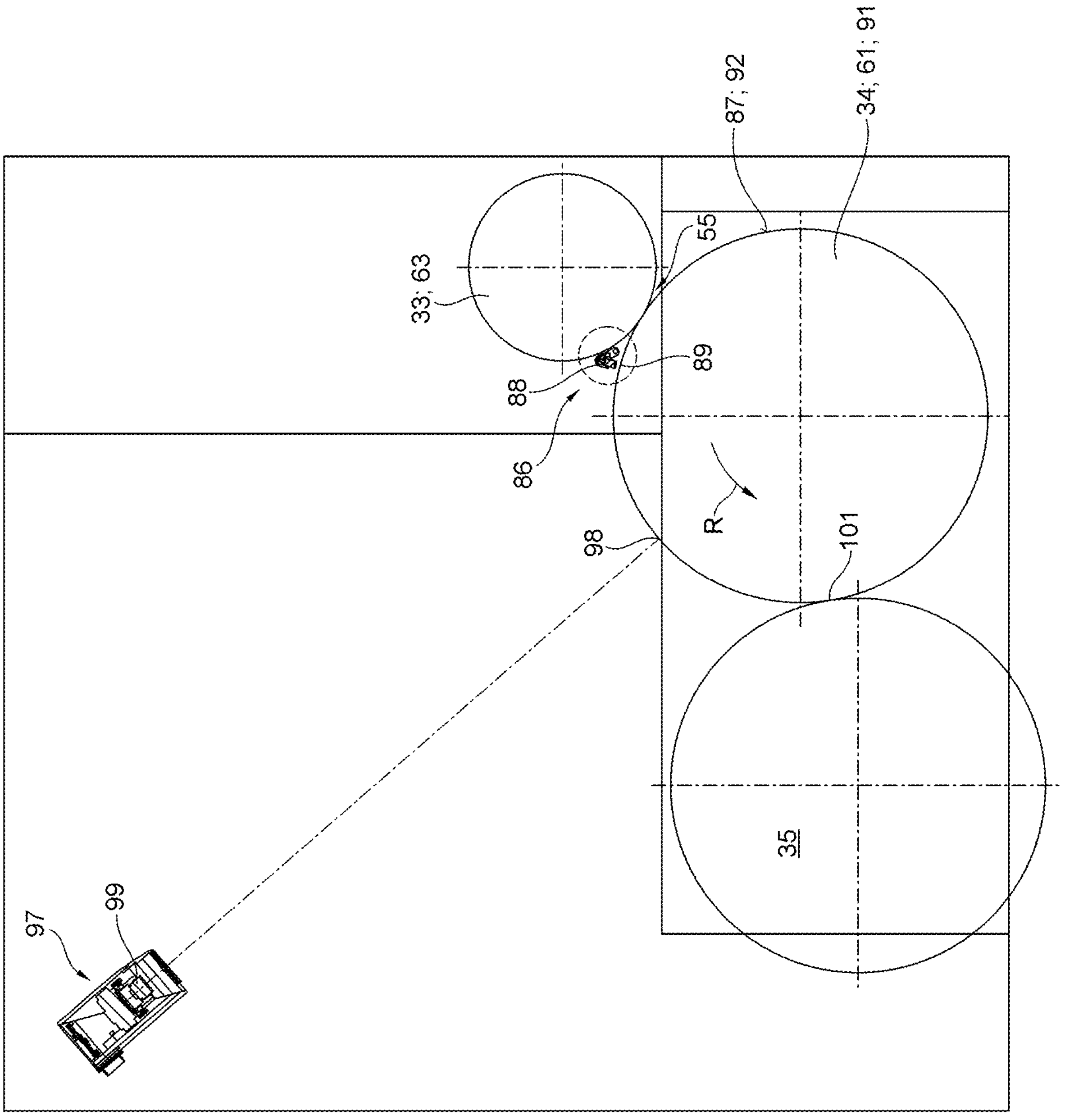
FIG. 8 a schematic representation of a part of a coating unit comprising a charging device.
Figure 9:
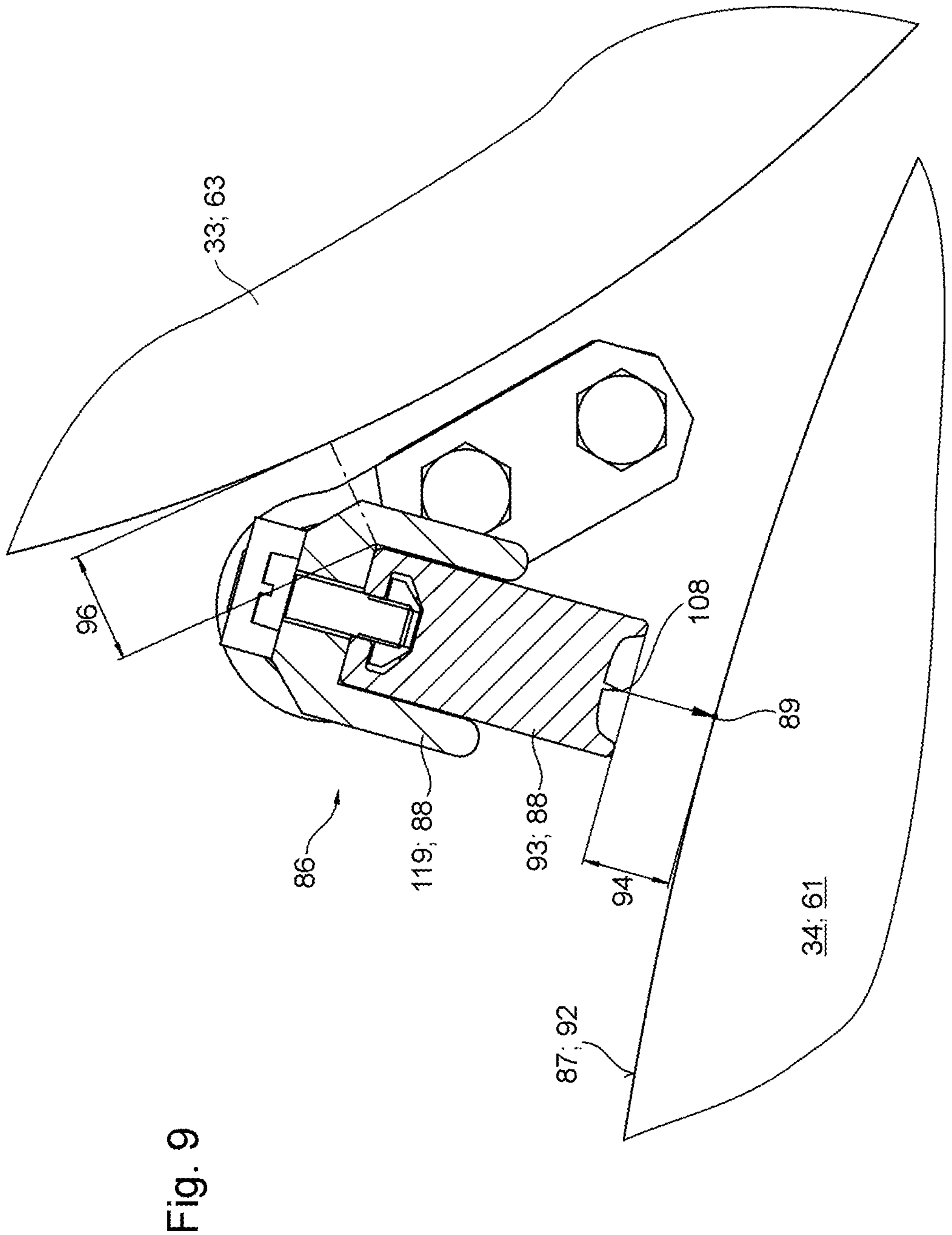
FIG. 9 a schematic representation of a charging device according to FIG. 8.
Figure 10:
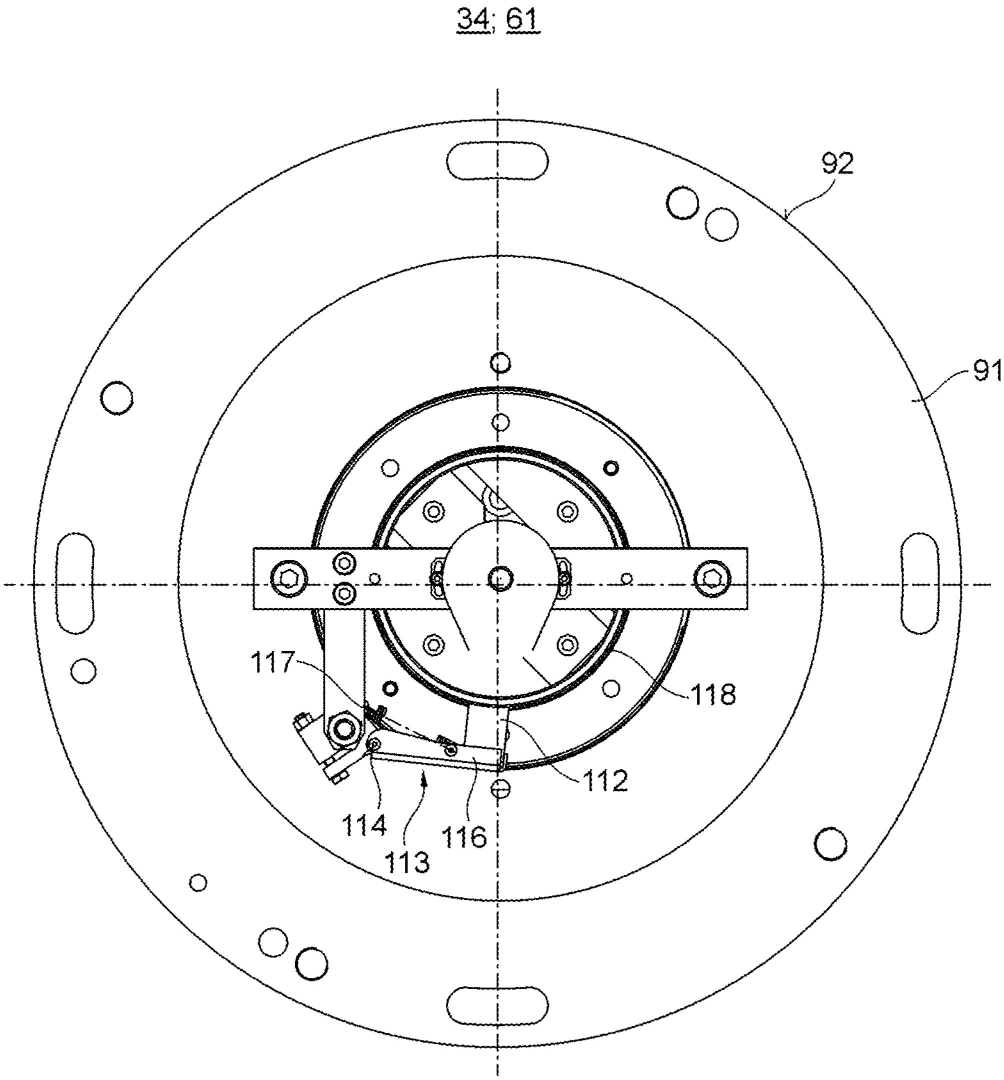
FIG. 10 a schematic representation of a cylinder comprising a grounding device.
Figure 11:
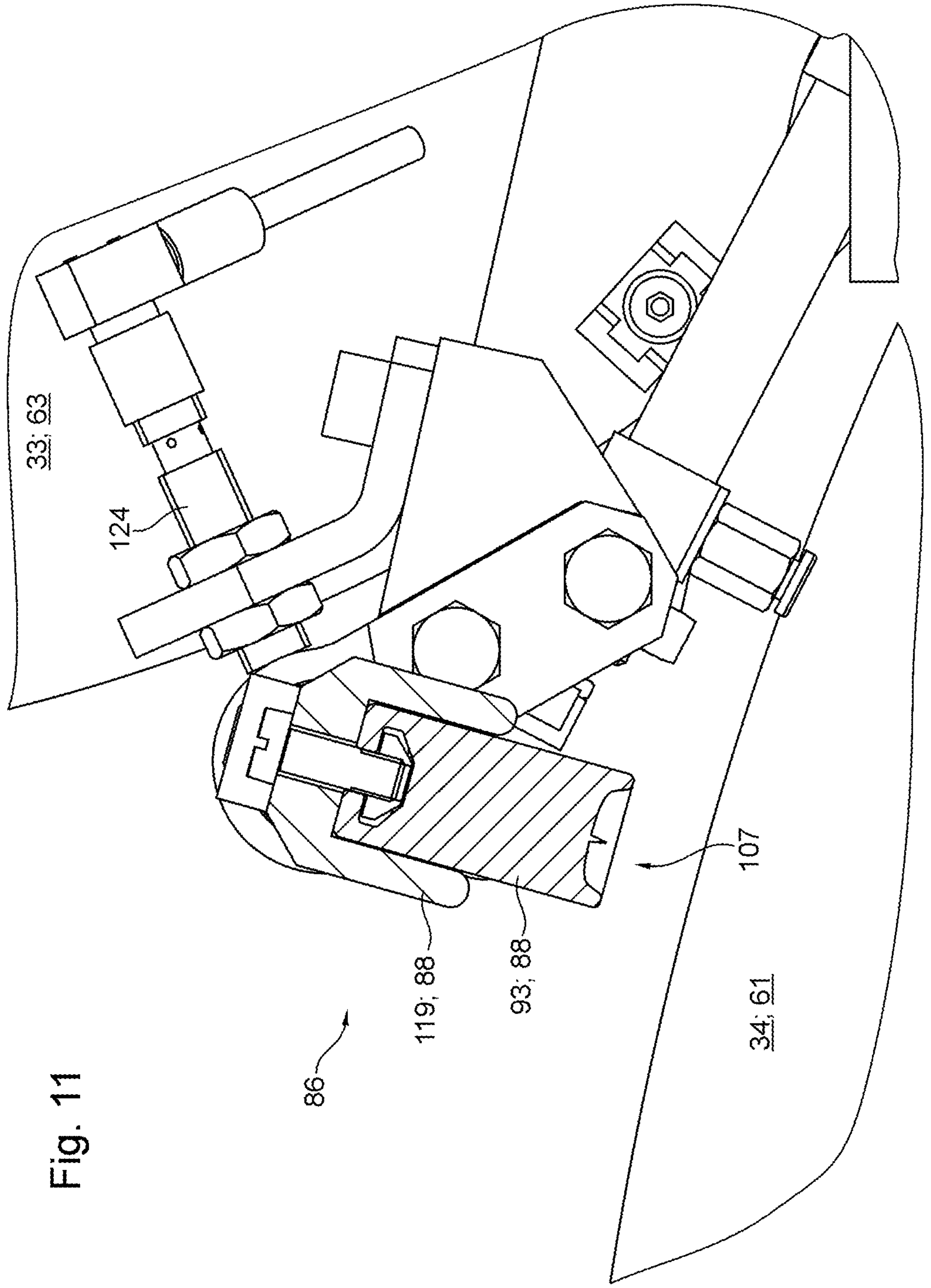
FIG. 11 a schematic representation of a charging device comprising an electrode unit in the working position thereof.
Figure 12:
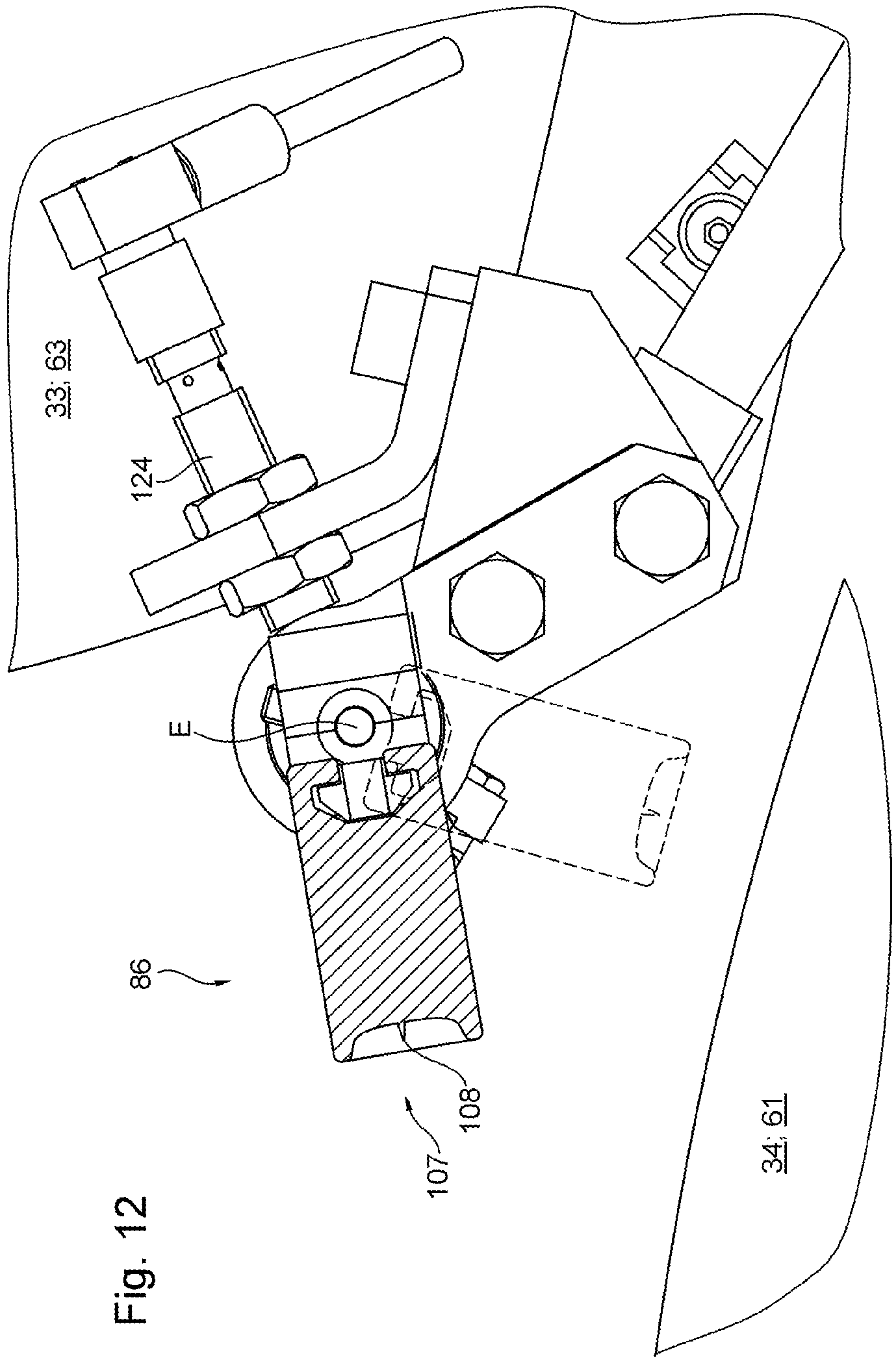
FIG. 12 a schematic representation of a charging device comprising an electrode unit in the backed-away position thereof.

The turning generally takes place according to the principle of trailing edge turning (see, for example, FIG. 6). The turning device 78 can, for example, be designed in the form of three-drum turning or as one-drum turning. In the case of three-drum turning, three sheet guide cylinders 79, 80, 81 are provided. Preferably a single-size or double-size transfer drum 79, a preferably double-size storage drum 80, and a preferably single-size turning drum 81 are arranged in the sheet transport direction 15. A single-size cylinder can receive a maximum-format sheet B around the circumference. Based on the diameter of the forme cylinder 32 designed, for example, as a plate cylinder 32, a single-size cylinder thus has the same diameter, and a double-size cylinder has a diameter twice as large.

The turning drum 81 is in particular equipped with a turning gripper system 82, and the storage drum 80 is then equipped with at least one respective sheet-holding system 83 per sheet-carrying outer surface. The sheet-holding systems 83 are preferably designed as a gripper system 83 for the leading sheet edge. Preferably, fixing elements are also provided for the rear region of a sheet B, which are preferably designed as suction systems 84. The suction systems 84 are preferably connected to adjustable rear shell segments and, in the circumferential direction, are adjustable relative to the gripper systems 83 on front shell segments so that sheets B having a maximum to a minimum format can be held in the front and rear regions on the storage drum 80 in the recto printing mode and/or in the recto and verso printing mode. Sheet guide elements for guiding the sheets B can be arranged beneath the storage drum 80 and/or turning drum 81. In a refinement, a guide doctor blade for guiding the sheet B between the storage drum 80 and the turning drum 81 is assigned to the turning device 78.

A finish coating unit 07, for example, is arranged downstream from the last printing unit 06. As is shown, for example, in the drawings, a cylinder designed as a printing cylinder 61 or as an impression cylinder 34 is arranged in the substructure 31, for example within a substructure module 31. The impression cylinder 61 is preferably identical to the impression cylinders 34, 36 of the printing units 05, 06.

The region of a finish coating unit superstructure 62 of the finish coating unit 07 designed, for example, as a superstructure module 62 differs from the printing unit superstructures 30 or superstructure modules 30 of the printing units 05, 06. Within this finish coating unit superstructure 62, a finish coating unit cylinder 63 designed, for example, as a finish coating forme cylinder 63 is arranged, on which a transfer means designed, for example, as a varnishing blanket or varnishing plate, is attached, for example mounted, via a fastening system 64, for example a clamping and/or tensioning system 64. So as to apply the finish coating to the coating blanket designed, for example, in the manner of a rubber printing blanket or to the varnishing plate, here an application system 65 designed as a chamber doctor blade system 65 is employed, preferably comprising an inking unit roller 66 having a well structure on the outer cylindrical surface, in particular an anilox roller 66, and a chamber doctor blade 67. The chamber doctor blade 67 here contains two doctor blades cooperating with the anilox roller 66.

A drying section is preferably provided downstream from the last printing unit 05, 06 or, if provided, downstream from the finish coating unit 07. So as to form the drying section, one or more drying devices 68 are arranged in the printing substrate path between the last unit 05, 06, 07 designed as a printing or finish coating unit 05, 06, 07 and a product bundle 71 formed, for example, by a delivery pile 71. Preferably, one or more drying devices 68 are arranged in the sheet delivery 08 above and/or beneath the sheet path. In a preferred embodiment, the path between the last finish coating or printing unit 05, 06, 07 and the sheet delivery 08 can be extended in particular by an interdisposed drying unit so as to gain space for arranging further drying devices 68. If needed, it is also possible for an intermediate drying step to be performed in the machine by drying devices 68 assigned to the cylinders. This intermediate drying step can also take place by a drying unit arranged in the machine.

The sheet delivery 08 of a sheet-processing machine, here in particular of a sheet-fed printing machine, specifically of a sheet-fed offset rotary printing machine, contains a sheet conveyor system which is arranged downstream from a sheet guiding system, here in the form of a sheet guide cylinder, specifically a printing cylinder 34, and which is in particular designed as a chain conveyor system 69. The sheet conveyor system comprises traction means moved by way of driving and deflection means, which drive gripping devices for conveying the sheets. The gripping devices comprise fixing elements for receiving and fixing the sheets B. Fixing elements that can be used include in particular clamping and/or suction grippers for gripping the sheet edges. In refinements that are not shown, additional gripping devices are provided for the trailing sheet edges.

The sheet conveyor system designed here as a chain conveyor system 69 comprises chains 73 which are placed over sprocket wheels 72 and driven thereby and which are guided in guide rails arranged laterally (not shown) and at which gripper carriages 70 for transporting the sheets B are arranged. From the gripper carriages 70, the sheets B are conveyed in the sheet transport direction 15 to the delivery pile 71 stored, for example, on a pallet 76 or another type of transport base. The gripper carriages 70 preferably include leading edge clamping grippers, which comprise gripper fingers that cooperate with gripper supports and are arranged so as to be spaced apart from one another on a gripper shaft and controllable thereby.

A sheet guide device and, for example, a dryer are provided in the sheet delivery 08 for securely transporting the sheets B held by the gripper carriages 70. The sheet guide device comprises sheet guide plates which face the gripper carriage 70 and are provided with blower air nozzles and which extend across the machine width. Blower modules are arranged beneath the sheet guide plate, by way of which the blower air nozzles are supplied with blower air so that a supporting air cushion is formed between the sheet guide plate and the sheets B transported by the gripper carriages 70. A cooling circuit can be integrated so as to be able to control a heating of the sheet guide plate in the region of the dryer. To prevent the sheets B from sticking together on the delivery pile 71, a separating agent application device, which is not described in greater detail here, is preferably provided in the region of the sheet delivery 08, in particular a powdering device, preferably combined with a device for extracting the powder.

A braking device, which is not described in greater detail, for decelerating the sheets B released by the gripper carriages 70 is arranged in front of the delivery pile 71. The braking device can include rotating suction rings and/or revolving suction belts or be designed as a progressive gripper. The sheets B that are decelerated by the braking system bear against front stops and in this way are deposited in an aligned manner onto the delivery pile 71. The delivery pile 71 is preferably lowered by a pile lifting drive by the respective deposited sheet thickness so that the pile surface always assumes an approximately constant level.

So as to avoid stopping the sheet-fed printing machine when changing the transport bases 76 designed, for example, as pallets 76, the sheet delivery 08 can be equipped with a non-stop device, which is not shown. This device predominantly comprises an auxiliary pile carrier, for example in the form of a roll-up slatted table, in particular also referred to as a roller rack. The roller rack comprises rods that are movably connected to one another. When in the idle position, it is arranged, in a rolled-up state, in front of the delivery pile 71 and, for pile changing while the sheet-fed printing machine is running, it is unrolled in the sheet transport direction 15 between two sheets B into a working position situated parallel to the surface of the delivery pile 71. In this position above the delivery pile 71, this slatted table temporarily receives the arriving sheets B, whereby an auxiliary pile is formed. Meanwhile the main pile can be removed and replaced with a new transport base 76, in particular a pallet 76. At the end of the pile changing process, the roller rack is pulled back into the idle position thereof, and the auxiliary pile is deposited on the new pallet 76.

At least one drive motor, which is not shown, is assigned to the sheet-fed printing machine.

In a first specific embodiment, this at least one drive motor is designed, for example, as a primary motor and drives, for example, a connected gear train forming a drive system. The drive system comprises, in particular, the printing cylinders 34, 36, the transfer drums 35, the transfer cylinder 33, the plate cylinders 32, and the inking units 42.

Individual functional units of the sheet-fed printing machine, such as, for example, of the substrate feed device 01, specifically the sheet feeder 01, the ink receiving roller 44 and/or possibly provided dampening units 51, can preferably be driven by separate drives, in particular dedicated drives, that is, without a mechanical and/or positive drive connection to drives of the other functional units and the drive system comprising the primary motor. In one embodiment refining the first specific embodiment, at least the plate cylinders 32 are detached from the drive system and only rotationally moved by separate drives assigned to the particular plate cylinder 32, in particular dedicated drives, that is, without a mechanical and/or positive drive connection to the drives of the other plate cylinders 32 and to the drive system comprising the primary motor and to drives of other functional units, such as, for example, of the substrate feed device 01, the ink fountain rollers 44 and/or the dampening units 51. The dedicated drives of the plate cylinders 32 can, in particular, be formed by so-called direct drives, wherein the direct drive is understood to mean an aforementioned dedicated drive in which the drive motor or the rotor thereof, preferably without interposed gear mechanism elements, is connected directly, or possibly via a coupling, in a mutually coaxial arrangement to the drive shaft, in particular the journal, of the plate cylinder 32. The drive motor is preferably designed in such a way that an interposed gear mechanism can be dispensed with. The circumferential speed of the plate cylinders 32 is matched to the circumferential speed of the cylinders cooperating with the plate cylinders 32. According to another specific embodiment, several of the units comprise, preferably each of the units comprises, a dedicated drive motor driving the drive system of the relevant unit, however without being coupled via a mechanical and/or positive drive connection to drives of other units.

The sheets B are provided in the printing substrate bundle 09 formed, for example, as a sheet pile 09. The uppermost sheet B of the sheet pile 09 is grasped by the feeder head 14 and fed to the further processing steps. This is carried out as follows, for example: The sheet separating elements 12 are guided towards the upper side of the sheet pile 09, grasp the respective uppermost sheet B and lift the same off the sheet B located beneath by being moved back into the starting position thereof. The blowers blow air beneath the sheet B held by the sheet separating elements 12, thereby separating the same completely from the sheet B located beneath. The sheet B held by the sheet separating elements 12 and separated completely is grasped by the sheet transport elements 13 and released by the sheet separating elements 12. The sheet transport elements 13 convey the grasped sheet B in the sheet transport direction 15, wherein the gate flap 17 can be pivoted downwardly as the sheet transport begins so that the sheet B can be transported with the leading sheet edge to, for example, the conveyor line 02 designed as a feed table 02. The timing rollers 25 are initially lifted off the drive roller 20 and are set down on the respective sheet B when the same is located in the gap between the timing rollers 25 and the drive roller 20. The respective sheet B is then released by the sheet transport elements 13. The sheets B conveyed by the sheet transport elements 13 in the sheet transport direction 15 are positioned on the conveyor line 02 designed, for example, as a feed table 02, while maintaining a specified imbrication distance, and are guided by the same in the working cycle of the sheet-fed printing machine against the front lay marks 27 and can thereafter be pulled off by the sheet acceleration means 04 designed, for example, as rocking grippers 04.

The grippers of, for example, the rocking gripper 04 transfer the sheet B to the grippers of the feed drum 29, which transfers the sheets B to the gripper system 57 of the printing cylinder 34 of the first printing unit 05.

The sheet B now present on the printing cylinder 34 is inked by the inking unit 42 via the forme cylinder 32 and, in the embodiment as an offset printing unit, via the transfer cylinder 33. This is carried out as follows, for example:

The printing ink stored, for example, in the ink reservoir 43 designed as an ink fountain 43 is applied to the ink receiving roller 44, for example ink fountain roller 44, in zones in a metered fashion and is preferably deposited by the vibrator inking roller 47 moving periodically back and forth in the form of ink strips onto the first inking unit roller 46 designed, for example, as an ink distributor roller 48. This roller transfers the ink via inking unit rollers 49 driven by friction onto the ink distributor rollers 48. Using further inking unit rollers 45, the ink is transferred onto the ink application rollers 50, thereby reaching the printing forme mounted on the forme cylinder 32, wherein, viewed in the direction of rotation of the forme cylinder 32, the application of dampening liquid can be carried out by the dampening forme roller 52 before the ink is applied by the ink application rollers 50.

The ink deposited onto the printing forme can be transferred onto the transfer cylinder 33 in accordance with the motif and is transferred by the same onto the sheet B guided by the printing cylinder 34.

The sheet B is now transferred from the first printing unit 05 to the following printing unit 06 and possibly succeeding further printing units 05, 06. This is carried out as follows, for example:

The sheet B is transferred from the gripper system 57 of the printing cylinder 34 to the gripper system 59 of the transfer drum 35 and in this way is guided further through the entire sheet-fed printing machine. The ink is then applied to the sheet B in the individual printing units 05, 06 via the relevant transfer cylinders 33.

On the path of the sheet B through the sheet-fed printing machine, the sheet B, if a turning device 78 is present, can also be turned and printed on the rear side. The mechanism of action of the sheet-holding system described in the exemplary embodiment in the recto and verso printing operating mode is as follows, for example:

The sheet B lying on the storage drum 80 and being printed in recto printing mode is guided by the sheet-holding system 83 in the region of the leading sheet edge and is additionally fixed by a sheet-holding system 84 designed as suction grippers of the sucker system 84 in the region of the trailing sheet edge. After the leading sheet edge has passed the tangency point between the storage drum 80 and the succeeding turning drum 81, it is released by the sheet-holding system 83. While the trailing sheet edge passes the tangency point between the storage drum 80 and the turning drum 81, it is received by the turning gripper system 82 of the turning drum 81 and released by the sheet-holding system 84 of the storage drum 80 so that the trailing sheet edge then becomes the leading sheet edge.

After the sheet B has passed the printing units 05, 06, it can be provided with a varnish coating in one or more finish coating units 07 by the finish coating forme cylinder 63. The gripper system of the printing system 61 then transfers the sheet B to, for example, the chain conveyor system 69 of the sheet delivery 08.

The sheets B grasped at the leading edge are guided, for example, on a path pointing upwardly by the gripper carriages 70 after having been received from the printing cylinder 61 and passed through a diverting region. In the process, the sheets B are dried by the provided drying devices 68 and, for example, powder is applied thereto. The sheets B are transported by the gripper carriages 70 up to the height of the delivery pile 71, where they are deposited thereon.

The sheet-fed printing machine designed in particular as a sheet-fed rotary printing machine preferably comprises at least one rotational transport body 34; 61 for transporting sheets B. A rotational transport body 34; 61 shall in particular be understood to mean a rotatably arranged unit or an assembly that serves to transport sheets B, in particular about an axis of rotation of the corresponding respective rotational transport body 34; 61. For example, an impression cylinder 34 of a printing unit 05; 06 and/or an impression cylinder 61 of a finish coating unit 07 represents a respective such rotational transport body 34; 61.

The sheet-fed rotary printing machine preferably comprises at least one coating unit 05; 06; 07, which is designed, for example, as a printing unit 05; 06 or as a finish coating unit 07. The at least one coating unit 05; 06; 07 comprises at least one impression cylinder 34; 61 and at least one further cylinder 33; 63 forming a contact zone 55 with the impression cylinder 34; 61. This contact zone 55 corresponds, for example, to the printing zone 55 in the case of a printing unit 05; 06. The at least one further cylinder 33; 63 forming the contact zone 55 with the impression cylinder 34; 61 is designed as a transfer cylinder 33, for example, in the case of an offset printing unit 05; 06 or as a finish coating forme cylinder 63 in the case of a finish coating unit 07.

The sheet-fed rotary printing machine preferably comprises at least one charging device 86 for electrostatically fixing sheets B on the rotational transport body 34; 61. Preferably, the coating unit 05; 06; 07, which is in particular designed as a printing unit 05; 06 or finish coating unit 07, preferably comprises at least one charging device 86 for electrostatically fixing sheets B on the impression cylinder 34; 61, the charging device comprising at least one electrode unit 88 that is directed and/or directable toward an outer cylindrical surface 87 of the impression cylinder 34; 61. The electrode unit 88 preferably comprises at least one electrode 93, possibly several. When hereafter details are illustrated based on a rotational transport body 34; 61 designed as an impression cylinder 34; 61, these can nonetheless be applied to general rotational transport bodies 34; 61, unless this results in contradictions. In particular, the electrode unit 88, generally speaking, is thus arranged so as to be directed and/or directable toward an outer cylindrical surface 87 of a rotational transport body 34; 61 and preferably can be moved between at least two positions.

A charging core zone 89 is preferably a region 89 of an outer cylinder surface 92, enveloping a cylinder barrel 91 of the impression cylinder 34; 61, which is located closest to the at least one electrode unit 88. The charging core zone 89 is preferably arranged downstream from the contact zone 55 and/or upstream from a transfer point 101 leading away from the impression cylinder 34; 61, viewed in the direction of rotation R of the impression cylinder 34; 61. The electrode unit 88 can thus electrostatically charge the sheets B transported through the contact zone 55 as close to the contact zone as possible and fix these to the cylinder barrel 91 of the impression cylinder 34; 61. The closer to the contact zone 55 this fixation starts, the shorter is the section of the sheet B that is not yet electrostatically fixed when the end of the sheet B leaves the contact region 55 and is thus no longer held by the two cylinders 33; 34; 61; 63.

In particular when the electrode unit 88 is arranged in the working position thereof, at least one electrode 93 of the at least one electrode unit 88, for example several and in particular all electrodes 93 of the at least one electrode unit 88, preferably have a minimum first distance 94 with respect to the impression cylinder 34; 61. The minimum first distance 94 is preferably at least 4 mm, more preferably at least 5 mm, still more preferably at least 7 mm, and still more preferably at least 9 mm. In particular independently thereof, the minimum first distance is preferably no more than 13 mm, more preferably no more than 12 mm, and still more preferably at least 11 mm. In particular when the electrode unit 88 is arranged in the working position thereof, at least one electrode 93 of the at least one electrode unit 88, for example several and in particular all electrodes 93 of the at least one electrode unit 88, preferably have a minimum second distance 96 with respect to the further cylinder 33; 63. The minimum second distance 96 is preferably at least 4 mm, more preferably at least 5 mm, still more preferably at least 7 mm, and still more preferably at least 9 mm. In particular independently thereof, the minimum second distance is preferably no more than 35 mm, more preferably no more than 30 mm, still more preferably no more than 20 mm, still more preferably no more than 15 mm, and still more preferably no more than 12 mm. An operating voltage of the electrode unit 88 that is applied and/or can be applied during normal operation is preferably at least 2 kV, more preferably at least 3 kV, still more preferably at least 5 kV, and still more preferably at least 8 kV. This operating voltage of the electrode unit 88 that is applied and/or can be applied during normal operation is preferably no more than 20 kV, more preferably no more than 15 kV, still more preferably no more than 12 kV, and still more preferably no more than 11 kV.

Preferably, the rotational transport body 34; 61, which is in particular designed as an impression cylinder 34; 61, is arranged so as to be grounded by way of at least one grounding device 113, and in particular by way of at least one carbon brush 112. The grounding device 113 comprises, for example, a lever arm 116, which is mounted pivotably about a pivot axis 114 and which is held, by means of a spring element 117, in a position in which the at least one carbon brush 112 is in contact with at least one slip ring 118, which is arranged rigidly relative to the cylinder barrel 91.

Preferably, at least one inspection system 97 is assigned to the coating unit 05; 06; 07, which is in particular designed as a printing unit 05; 06 or finish coating unit 07, which comprises a camera 99 that, in particular with respect to the detection range thereof, is directed toward an inspection zone 98 assigned to the impression cylinder 34; 61. For example, an illumination device is provided in addition and/or is integrated. This inspection zone 98 is preferably arranged downstream from the contact zone 55 and/or upstream from the transfer point 101 leading away from the impression cylinder 34; 61, viewed in the direction of rotation R of the impression cylinder 34; 61. The camera 99 is preferably designed as a high resolution camera 99 and is preferably part of a system for capturing and/or regulating the perfecting register and/or color values and/or print image contents. This camera 99 is, for example, arranged downstream from a last printing unit 06 and/or downstream from a last finish coating unit 07 in the transport direction. In particular when the electrode unit 88 is arranged in the working position thereof, the charging zone 89, viewed in the direction of rotation R of the impression cylinder 34; 61, is preferably arranged upstream from the inspection zone 98 and preferably downstream from the contact zone 55.

The sheet-fed rotary printing machine preferably comprises a higher-level machine control system. For example, drives that effectuate a rotation of at least the impression cylinder 34; 61 and/or drives that effectuate a rotation of at least one forme cylinder 32 and/or at least one finish coating forme cylinder 63 are connected by circuitry to this machine control system. For example, this higher-level machine control system is connected by circuitry to the control console of the sheet-fed rotary printing machine. Preferably, the at least one charging device 86 is connected by circuitry to the higher-level machine control system of the sheet-fed rotary printing machine. For example, the at least one charging device 86 comprises a high voltage generator, which is arranged so as to be connected to the at least one electrode unit 88 and/or the at least one electrode 93. For example, the at least one charging device 86 is at least connected by circuitry to the higher-level machine control system of the sheet-fed rotary printing machine in such a way that the high voltage generator is connected by circuitry to the higher-level machine control system of the sheet-fed rotary printing machine.

For example, the at least one charging device 86 is connected in such a way that the application of the working voltage to the at least one electrode 93 begins at the earliest with a start of a sheet travel and/or ends at the latest with the end of the sheet travel. This means in particular that the at least one charging device 86 is connected by circuitry to the higher-level machine control system of the sheet-fed rotary printing machine in such a way that the working voltage provided during normal operation is only present at the at least one electrode 93 when sheet travel is activated. Preferably, the at least one charging device 86 is connected by circuitry to the higher-level machine control system of the sheet-fed rotary printing machine in such a way that settings related to this charging device 86 can be made via a control element of the sheet-fed rotary printing machine designed, in particular, as a machine control console or touch-sensitive display device.

The at least one electrode unit 88 is preferably arranged so as to be movable between at least two positions. One of the at least two positions is a working position. Another of the at least two positions is preferably a backed-away position. The working position is in particular such a position that the electrode unit 88 assumes during a printing operation and is used to allow the electrode unit 88 to act on sheets B. The backed-away position is in particular such a position that the electrode unit 88 assumes to be serviced or cleaned and/or to create more space between the electrode unit 88 and the rotational transport body 34; 61 or impression cylinder 34; 61. The backed-away position can be used, on the one hand, for servicing and/or mounting and/or cleaning the electrode unit 88 or of parts of the electrode unit 88. However, preferably as an alternative or in addition, the function of the backed-away position is to increase a distance between the rotational transport body 34; 61, which is preferably designed as an impression cylinder 34; 61, on the one hand and the at least one electrode unit 88 on the other hand, in particular compared to a situation in which the at least one electrode unit 88 is arranged in the working position thereof. Preferably, the at least one electrode 93 of the at least one electrode unit 88 is arranged further away from the rotational transport body 34; 61 when the electrode unit 88 is arranged in the backed-away position than when the electrode unit 88 is arranged in the working position thereof, for example at least one and half times as far, more preferably twice as far and/or at least 5 mm further, more preferably at least 8 mm further.

Preferably, at least one first holding element 102 for holding the electrode unit 88 in the working position is provided. An evasive force K shall in particular be understood to mean a force K that is exerted, directly or indirectly, by the at least one electrode unit 88 on this at least one first holding element 102. An indirect exertion of such a force shall, for example, be understood to mean that a mechanical system can be interposed, which can possibly influence forces and/or torque, in particular a positioning device 104. This evasive force K is preferably a force K the direction of which has at least one component that is parallel to a direction pointing from the contact zone to the at least one electrode unit 88. Preferably, the at least one first holding element 102 only allows a movement of the at least one electrode unit 88 out of the working position effectuated by such an evasive force K when this evasive force exceeds a first threshold value. This first threshold value is preferably a fixed property of the at least one first holding element 102. The at least one electrode unit 88 is thus preferably fixed in the working position thereof during normal operation, but can perform an evasive maneuver in the event of a disruption due to undesirable material transport. Such a case exists, for example, when material thicker than the normal distance between the rotational transport body 34; 61 or impression cylinder 34; 61 on the one hand and the electrode unit 88 on the other hand is carried along by the rotational transport body 34; 61 and transported along the outer cylindrical surface 87 thereof. If the electrode unit 88 were rigidly arranged, it could otherwise be damaged. This must be observed in particular when it comes to the preferred distances in the working position. Such a material can, for example, be an accordingly drastically deformed sheet B and/or an accumulation of several sheets B and/or dirt and/or waste material that previously accumulated elsewhere and then became detached.

The at least one first holding element 102, depending on the configuration thereof, can act in one direction or in two directions. For example, the at least one first holding element 102 is designed as a magnetic holding element 102. The holding element then only prevents undesirable movements of the at least one electrode unit 88 out of the working position and/or toward the backed-away position or into the backed-away position. The at least one first holding element 102 is preferably designed as a mechanical detent element 102. For example, the holding element then comprises at least one spring element that, for example, pushes a stop member into a position that prevents a movement of the at least one electrode unit 88 when evasive forces K are too low. This also consequently prevents undesirable movements of the at least one electrode unit 88 into the working position.

Preferably, at least one second holding element 103 is provided, in particular for holding the electrode unit 88 in the backed-away position. A restoring force F shall in particular be understood to mean a force F that is exerted, directly or indirectly, by the at least one electrode unit 88 on this at least one second holding element 103. An indirect exertion of such a force shall, for example, be understood to mean that a mechanical system can be interposed, which can possibly influence forces and/or torque, in particular a positioning device 104. This restoring force F is preferably a force F the direction of which has at least one component that is parallel to a direction pointing from the at least one electrode unit 88 toward the contact zone. Preferably, the at least one second holding element 103 only allows a movement of the at least one electrode unit 88 out of the backed-away position effectuated by such a restoring force F when this restoring force exceeds a second threshold value. This second threshold value is preferably a fixed property of the at least one second holding element 103.

The at least one second holding element 103, depending on the configuration thereof, can act in one direction or in two directions. For example, the at least one second holding element 103 is designed as a magnetic holding element 103. The holding element then only prevents undesirable movements of the at least one electrode unit 88 out of the backed-away position and/or toward the working position. The at least one second holding element 103 is preferably designed as a mechanical detent element 103. For example, the holding element then comprises at least one spring element that, for example, pushes a stop member into a position that prevents a movement of the at least one electrode unit 88 when restoring forces F are too low. This also consequently prevents undesirable movements of the at least one electrode unit 88 into the backed-away position.

Preferably, at least one positioning device 104 is provided, which comprises at least one servo drive 106 and by means of which the at least one electrode unit 88 can be moved between the working position and the backed-away position, in particular in both directions. In the event that the backed-away position is only to be used for maintenance and/or cleaning purposes, a movement only by way of the positioning device 104 would suffice. In particular in order to arrange the at least one electrode unit 88 so as to be deflectable in the event of a disruption, the at least one positioning device 104 can preferably be switched between a release state and a fixing state, in particular by means of the at least one servo drive 106. In the release state thereof, the at least one positioning device 104 allows a movement of the at least one electrode unit 88 out of the working position and preferably also into the working position. In the fixing state thereof, the at least one positioning device 104 fixes the at least one electrode unit 88, for example, in the backed-away position.

The at least one electrode unit 88 is preferably mounted so as to be pivotable, in particular about an electrode pivot axis E, and/or the at least one electrode unit 88 is designed so as to be movable between the working position and the backed-away position by means of a pivoting movement. The at least one electrode unit 88 preferably has an active side 107 that is arranged facing the rotational transport body 34; 61 when the electrode unit 88 is arranged in the working position, and that is arranged facing away from the rotational transport body 34; 61 when the electrode unit 88 is arranged in the backed-away position. For example, the at least one electrode 93 is enclosed in a housing 119 of the electrode unit 88 and preferably only accessible from the outside from one direction. This direction then establishes the active side 107. The at least one electrode 93 preferably has regions that have particularly small radii of curvature on the surface thereof, which more preferably are designed as needles 108. These needles 108 are preferably arranged on the active side 107. A corresponding electric field strength is especially high at these regions, in particular needles 108, and allows a particularly effective charge of the sheets B.

The servo drive 106 of the positioning device 104 is preferably connected in an articulated manner to the at least one electrode unit 88. A corresponding first joint 121 is preferably arranged so as to be spaced apart from the pivot axis 114, and more preferably closer to the active side 107 of the electrode unit 88 than the pivot axis 114. The at least one servo drive 106 of the at least one positioning device 104 is preferably designed as a pneumatic cylinder 106 and/or as a hydraulic cylinder 106 and/or as an electric drive 106 and/or as a linear drive 106. The servo drive 106 is preferably connected via a second joint 122 to a bearing element 111. The at least one servo drive 106 is preferably connected in an articulated manner to the at least one electrode unit 88 in such a way that, at least when the electrode unit is arranged in the working position, a first articulation angle 123 deviates from a right angle (90°) by no more than 45°, more preferably no more than 30°, and still more preferably no more than 20°, with this articulation angle 123 preferably being the angle between two straight lines, one of which intersects both the electrode pivot axis E and a pivot axis of the first joint 121, and the other intersects both the pivot axis of the first joint 121 and the pivot axis of the second joint 122.

The bearing element 111 can be arranged so as to be stationary. Preferably, however, the bearing element is designed so as to be movable. For example, the bearing element 111 is designed as a sliding block 111 movable in a guide 109. The at least one servo drive 106 is thus preferably in particular arranged in an articulated manner on a sliding block 111, which is arranged so as to be movable along a guide 109. Preferably, the sliding block 111 can be held in a first holding position by means of the at least one first holding element 102 for holding the electrode unit 88 in the working position. Preferably, the sliding block 111 can be held in a second holding position by means of the at least one second holding element 103 for holding the electrode unit 88 in the backed-away position.

Figure 13:
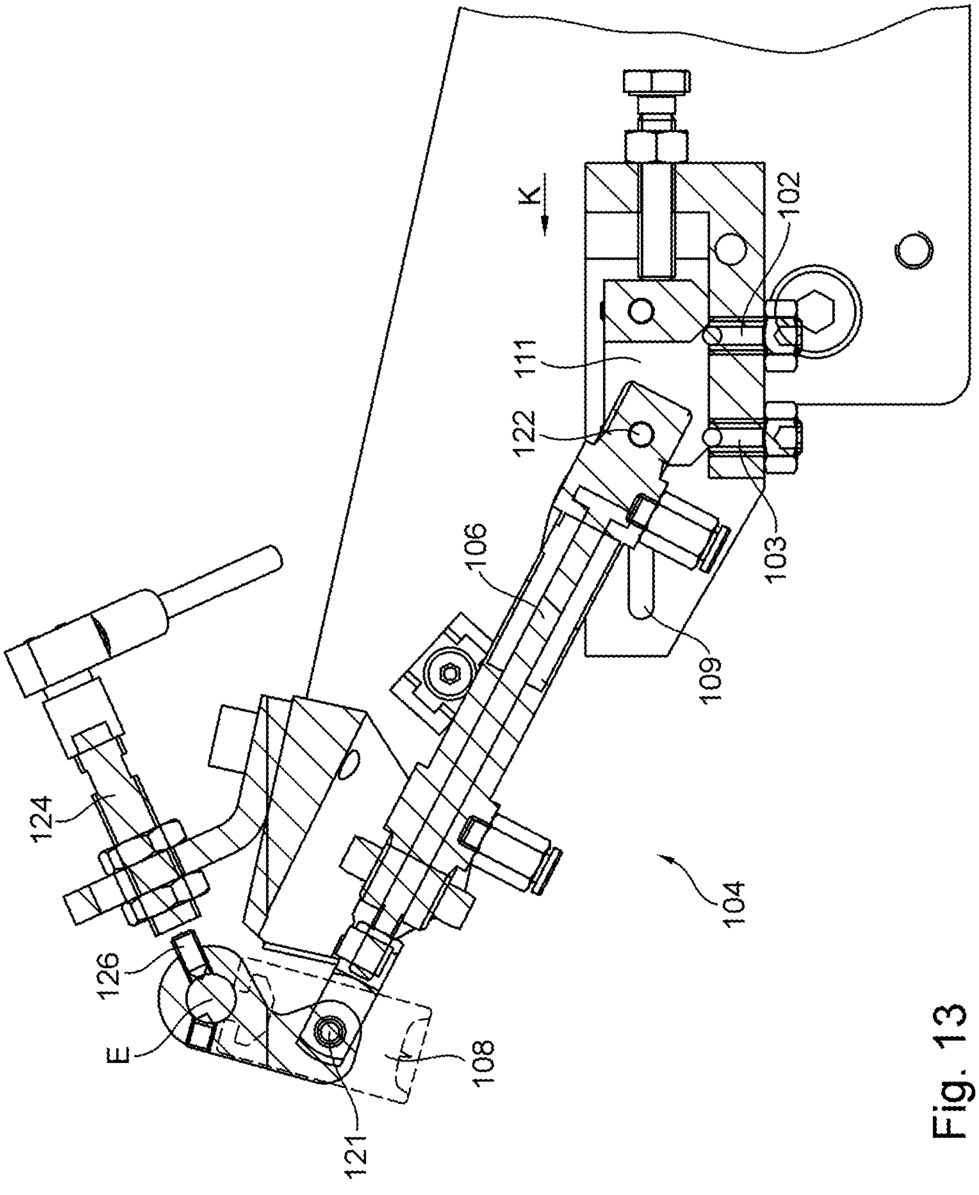
FIG. 13 a schematic representation of a positioning device in an operating configuration.
Figure 14:
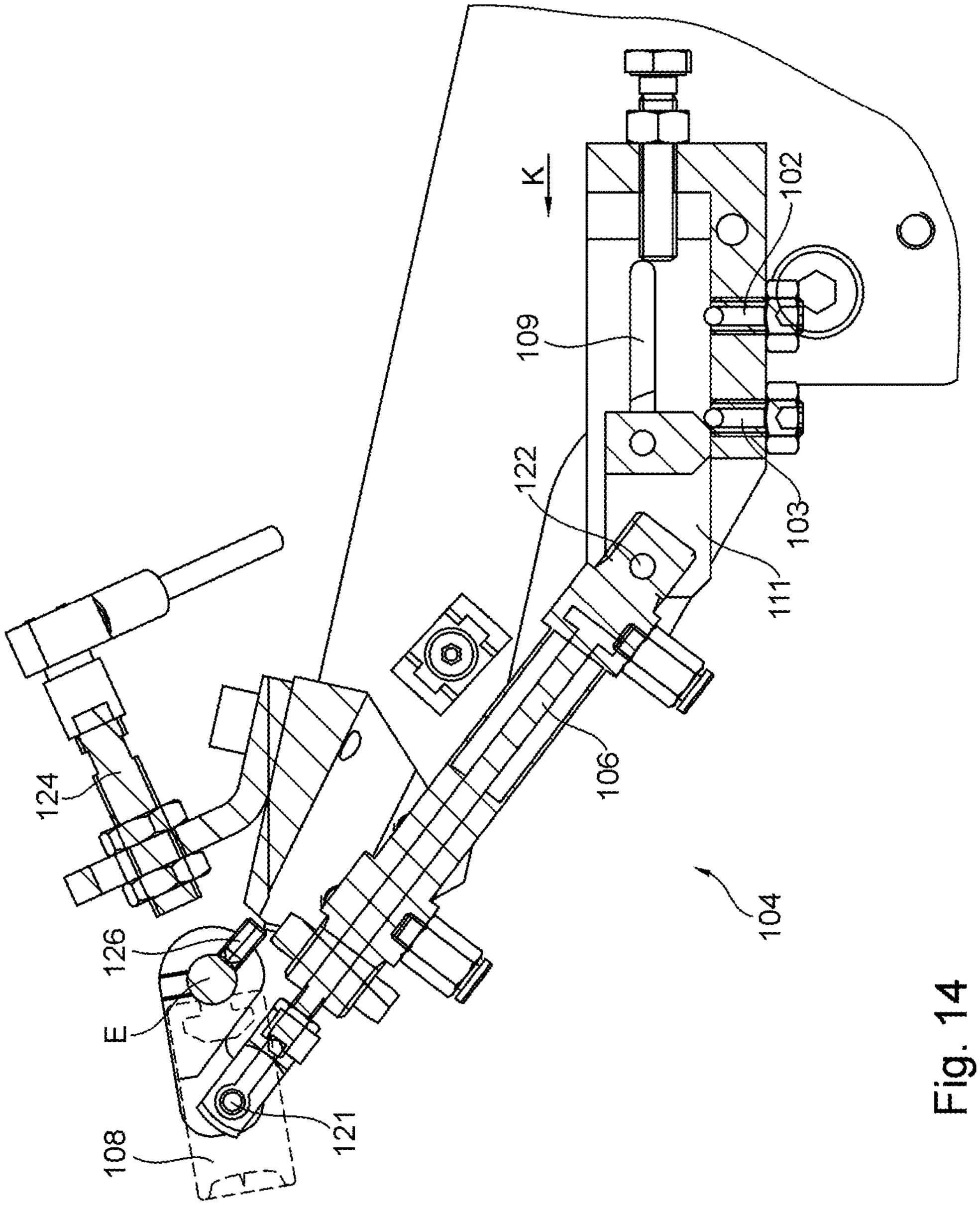
FIG. 14 a schematic representation of a positioning device in an evasive configuration.
Figure 15:
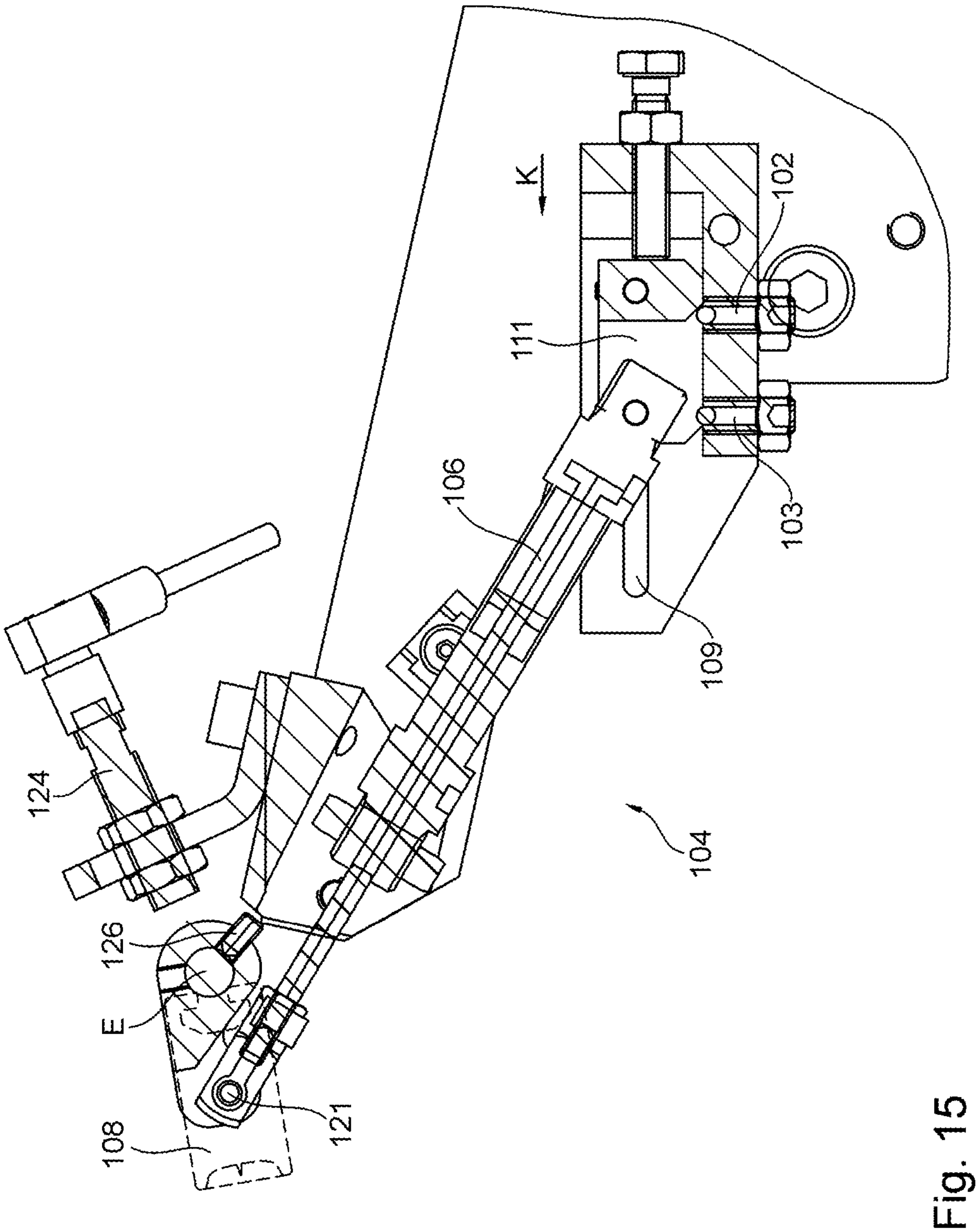
FIG. 15 a schematic representation of a positioning device in a maintenance configuration.

In an exemplary specific embodiment, the positioning device 104 can be switched between three provided configurations. A first of these configurations is an operating configuration. (This is also shown in FIG. 13, for example). A second of these configurations is a maintenance configuration. (This is also shown in FIG. 15, for example). A third of these configurations is an evasive configuration. (This is also shown in FIG. 14, for example).

The positioning device 104 is preferably arranged in the operating configuration, in particular during an intended printing operation of the sheet-fed rotary printing machine. In this operating configuration, the at least one electrode unit 88 is arranged in the working position thereof, and the servo drive 106 is preferably arranged in a retracted state, and the at least one sliding block 111 is preferably arranged in the first holding position thereof, preferably by means of the at least one first holding element 102. Under customary operating conditions, the electrode unit 88 is held fixedly in the working position thereof by the servo drive 106, which is rigid per se, and the action of the first holding element 102.

The servo drive 106 can be extended, in particular for maintenance purposes. In the process, the servo drive 106 is supported on a stationary component, in particular via the sliding block 111. As a result, the electrode unit 88 is pivoted into the backed-away position. The active side 107 of the electrode unit 88 can thus be made accessible, in particular when a corresponding guard of the housing of the sheet-fed rotary printing machine is opened. The positioning device 104 is then in the maintenance configuration thereof. Thereafter, the servo drive 106 can be retracted again. The first holding element 102 is designed in such a way that the forces that occur during normal operation cannot move the sliding block 111, and the sliding block remains in the position thereof. The contraction of the servo drive 106 then effectuates a pivoting movement of the electrode unit 88 back into the working position. The positioning device 104 is then in the operating configuration thereof again.

When in the working position, the electrode unit 88 is arranged spaced a relatively small distance apart from the impression cylinder 34; 61. If excessively thick material is carried along by the impression cylinder 34; 61, this could damage the electrode unit 88 if it remained in its location. The positioning device 104 is therefore designed so as to allow a passive evasive maneuver of the electrode unit 88. As soon as a force is exerted on the electrode unit 88 in such a way that an evasive force K having an appropriate magnitude acts, the electrode unit 88 performs a pivoting movement into the backed-away position. For this purpose, the electrode unit pulls on the servo drive 106, which transmits this pulling motion onto the sliding block 111. Since the evasive force K exceeds the first threshold value, the sliding block overcomes the holding force of the first holding element 102. The sliding block 111 moves into the second holding position, while the electrode unit 88 moves into the backed-away position. The servo drive 106 remains in the retracted state thereof during this process. The positioning device 104 is now in the evasive configuration thereof.

So as to transfer the positioning device 104 back into the operating configuration thereof, and thereby transfer the electrode unit 88 back into the working position thereof, initially the servo drive 106 is extended. The end of the servo drive 106 which is arranged at the electrode unit 88 cannot perform any further evasive maneuver, and the force exerted by the servo drive 106 therefore moves the sliding block 111 along the guide 109 into the first holding position, overcoming the second holding device 103 and optionally also the first holding device 120. The positioning device 104 is then initially in the maintenance configuration thereof and can be transferred out of the same as described above, back into the operating configuration.

Preferably, at least one position sensor 124 is provided. This position sensor 124 is used in particular to check whether or not the electrode unit 88 is in the working position thereof. For example, the at least one position sensor 124 is designed as a proximity switch 124. Any type of proximity switch 124 may be used, in particular inductive, capacitive, magnetic, and optical proximity switches as well as photoelectric sensors and/or ultrasonic sensors. For example, a sample body 126 is provided, the detection of which by the position sensor 124 provides information about the position of the electrode unit 88. The sample body 126 is preferably arranged so as to be adjustable and, for example, is designed as a threaded pin 126. Preferably, the at least one position sensor 124 is connected by circuitry to the higher-level machine control system. When the position sensor 124, with sheet travel being activated, detects an evasive movement of the electrode unit 88, the sheet-fed rotary printing machine can be prompted to be stopped via the machine control system.

Although the disclosure herein has been described in language specific to examples of structural features and/or methodological acts, it is to be understood that the subject matter defined in the appended claims is not necessarily limited to the specific features or acts described in the examples. Rather, the specific features and acts are disclosed merely as example forms of implementing the claims.

The invention claimed is:

1. A sheet-fed rotary printing machine, the sheet-fed rotary printing machine comprising at least one coating unit (05; 06; 07), which comprises at least one impression cylinder (34; 61) and at least one further cylinder (33; 63) forming a contact zone (55) with the impression cylinder (34; 61) and designed as a transfer cylinder (33) or finish coating forme cylinder (63); and the coating unit (05; 06; 07) comprising at least one charging device (86) for electrostatically fixing sheets (B) on the impression cylinder (34; 61), the charging device comprising at least one electrode unit (88) that is directed and/or can be directed toward an outer cylindrical surface (87) of the impression cylinder (34; 61); and a charging core zone (89) being a region (89) of an outer cylinder surface (92), enveloping a cylinder barrel (91) of the impression cylinder (34; 61), which is located closest to the at least one electrode unit (88); and the charging core zone (89) being arranged downstream from the contact zone (55) and upstream from a transfer point (101) leading away from the impression cylinder (34; 61), viewed in the direction of rotation (R) of the impression cylinder (34; 61), characterized in that at least one electrode (93) of the at least one electrode unit (88) has a minimum first distance (94) with respect to the impression cylinder (34; 61), which is at least 4 mm and which is no more than 13 mm, and that the at least one electrode (93) of the at least one electrode unit (88) has a minimum second distance (96) with respect to the further cylinder (33; 63), which is at least 4 mm and which is no more than 35 mm.

2. The sheet-fed rotary printing machine according to claim 1, characterized in that at least one inspection system (97) is assigned to the coating unit (05; 06; 07), which comprises a camera (99) that is directed toward an inspection zone (98) assigned to the impression cylinder (34; 61), and that the inspection zone (98) is arranged downstream from the contact zone (55) and upstream from the transfer point (101) leading away from the impression cylinder (34; 61), viewed in the direction of rotation (R) of the impression cylinder (34; 61).

3. The sheet-fed rotary printing machine according to claim 2, characterized in that the charging core zone (89) is arranged upstream from the inspection zone (98), viewed in the direction of rotation (R) of the impression cylinder (34; 61).

4. The sheet-fed rotary printing machine according to claim 1, characterized in that the minimum first distance (94) is at least 5 mm or at least 7 mm or at least 9 mm.

5. The sheet-fed rotary printing machine according to claim 1, characterized in that the minimum first distance (94) is no more than 12 mm or no more than 11 mm.

6. The sheet-fed rotary printing machine according to claim 1, characterized in that the minimum second distance (96) is at least 5 mm or at least 7 mm or at least 9 mm.

7. The sheet-fed rotary printing machine according to claim 1, characterized in that the minimum second distance (96) is no more than 30 mm or no more than 20 mm or no more than 15 mm or no more than 12 mm.

8. The sheet-fed rotary printing machine according to claim 1, characterized in that a working voltage of the electrode unit (88), which is applied and/or can be applied during normal operation, is at least 2 kV.

9. The sheet-fed rotary printing machine according to claim 1, characterized in that a working voltage of the electrode unit (88), which is applied and/or can be applied during normal operation, is no more than 20 kV.

10. The sheet-fed rotary printing machine according to claim 1, characterized in that the at least one charging device (86) is connected by circuitry to a higher-level machine control system of the sheet-fed rotary printing machine.

11. The sheet-fed rotary printing machine according to claim 10, characterized in that the at least one charging device (86) is connected by circuitry to the higher-level machine control system of the sheet-fed rotary printing machine in such a way that the working voltage provided during normal operation is only present at the at least one electrode (93) when sheet travel is activated.

12. The sheet-fed rotary printing machine according to claim 10, characterized in that the at least one charging device (86) is connected by circuitry to the higher-level machine control system of the sheet-fed rotary printing machine in such a way that settings related to this charging device (86) can be made via a control element of the sheet-fed rotary printing machine.

13. The sheet-fed rotary printing machine according to claim 1, characterized in that the impression cylinder (34; 61) is grounded via at least one carbon brush (112).

14. The sheet-fed rotary printing machine according to claim 1, characterized in that the at least one electrode unit (88) is arranged so as to be movable between at least two positions, and that one of the at least two positions is a working position and another of the at least two positions is a backed-away position, and that at least one first holding element (102) is provided for holding the electrode unit (88) in the working position.

15. The sheet-fed rotary printing machine according to claim 14, characterized in that an evasive force (K) shall be understood to mean a force (K) that is exerted, directly or indirectly, by the at least one electrode unit (88) on this at least one first holding element (102), and that the at least one first holding element (102) only allows a movement of the at least one electrode unit (88) out of the working position effectuated by such an evasive force when this evasive force exceeds a first threshold value.

* * * * *